United States Patent [19]

Gale et al.

[11] Patent Number: 5,692,820

[45] Date of Patent: *Dec. 2, 1997

[54] PROJECTION MONITOR

[75] Inventors: Ronald P. Gale, Sharon; Richard McCullough, Wrenthem; Jack P. Salerno, Waban; Stephen D. Fantone, Lynnfield; Robert Park Forsyth, Lexington; Peter T. Carellas, Winchester; Michael J. Thomas, Needham; Roy L. Youman, Newton, all of Mass.

[73] Assignee: Kopin Corporation, Taunton, Mass.

[*] Notice: The term of this patent shall not extend beyond the expiration date of Pat. No. 5,467,154.

[21] Appl. No.: 379,856

[22] Filed: Jan. 27, 1995

Related U.S. Application Data

[63] Continuation-in-part of Ser. No. 15,813, Feb. 10, 1993, Pat. No. 5,467,154, which is a continuation-in-part of Ser. No. 839,241, Feb. 20, 1992, abandoned.

[51] Int. Cl.[6] .................................................. G03B 21/28
[52] U.S. Cl. ................................ 353/77; 353/74; 353/31
[58] Field of Search ................................ 353/74, 76, 77, 353/78; 348/744, 790, 794, 836, 843; 359/460, 456, 453

[56] References Cited

U.S. PATENT DOCUMENTS

| | | | |
|---|---|---|---|
| 4,270,846 | 6/1981 | Miyamoto | 350/336 |
| 4,429,305 | 1/1984 | Hosokawa et al. | 340/784 |
| 4,578,710 | 3/1986 | Hasegawa | 353/78 |
| 4,740,782 | 4/1988 | Aoki et al. | 340/719 |
| 4,770,498 | 9/1988 | Aoki et al. | 350/334 |
| 4,782,340 | 11/1988 | Czubatyj et al. | 340/825 |
| 4,864,390 | 9/1989 | McKechnie et al. | 358/60 |
| 4,917,465 | 4/1990 | Conner et al. | 350/335 |
| 4,941,732 | 7/1990 | Umeda et al. | 353/78 |
| 4,952,031 | 8/1990 | Tsunoda et al. | 350/342 |
| 4,978,952 | 12/1990 | Irwin | 340/795 |
| 5,020,881 | 6/1991 | Matsuda et al. | 350/333 |
| 5,048,949 | 9/1991 | Sato et al. | 353/527 |
| 5,056,895 | 10/1991 | Kahn | 359/87 |
| 5,073,772 | 12/1991 | Takafuji et al. | 340/784 |
| 5,076,543 | 12/1991 | Mandai | 353/122 |
| 5,084,807 | 1/1992 | McKechnie et al. | 362/228 |
| 5,090,800 | 2/1992 | Ushiro | 353/71 |
| 5,092,664 | 3/1992 | Miyatake et al. | 359/41 |
| 5,095,304 | 3/1992 | Young | 340/766 |
| 5,105,265 | 4/1992 | Sato et al. | 353/34 |
| 5,223,869 | 6/1993 | Yanagi | 353/74 |
| 5,278,595 | 1/1994 | Nishida et al. | 353/78 |
| 5,331,462 | 7/1994 | Yano | 359/651 |
| 5,442,484 | 8/1995 | Shikawa | 359/651 |
| 5,467,154 | 11/1995 | Gale et al. | 353/77 |

FOREIGN PATENT DOCUMENTS

| | | |
|---|---|---|
| 0135216 | 3/1985 | European Pat. Off. . |
| 0469575A2 | 3/1985 | European Pat. Off. . |
| 0331326 | 6/1989 | European Pat. Off. . |
| 0438817A1 | 7/1991 | European Pat. Off. . |
| 63-102572 | 5/1988 | Japan . |
| 0383038 | 4/1991 | Japan .................... 353/74 |
| 3053236 | 7/1991 | Japan . |
| 4333038 | 11/1992 | Japan .................... 353/74 |
| 0618984 | 1/1994 | Japan .................... 353/74 |
| 2 191 057 | 12/1987 | United Kingdom . |

OTHER PUBLICATIONS

Ohta et al., "Electronic Display Devices," Edited by Shoichi Matsumoto, Toshiba Corp. pp. 81–83.

(List continued on next page.)

*Primary Examiner*—William Dowling
*Attorney, Agent, or Firm*—Hamilton, Brook, Smith & Reynolds, P.C.

[57] ABSTRACT

A rear projection monitor having a housing with reduced depth is disclosed. Images produced by liquid crystal active matrices are illuminated by a light source. The images are enlarged and projected by a projection lens having a large rear focus. A mirror reflects the projected images onto a viewing screen. The mirror is positioned between 36° and 45° in relation to the viewing screen. The back of the housing is adjacent to and slopes at the same angle as the mirror. The depth of the projection monitor is between 33% to 41% of the diameter of the viewing screen.

16 Claims, 17 Drawing Sheets

OTHER PUBLICATIONS

Sumiyoshi et al., "Device Layer Transferred Poly Si TFT Array For High Resolution Liquid Crystal projector," *IEDM* 89:165–168 (Jul. 1989).

Flat Information Displays—1990, "An Interactive Meeting For Display Users & Suppliers To Define & Analyze the Impact of Flat Information Displays on their Products," Dec. 11 & 12, 1990, Conference Sponsors: Stanford Resources, Inc., information Associates.

Tannas, Lawrence, Jr., "Flat–Panel and Projection Display Overview," SEMI Conference, Boston, MA Oct. 21, 1991, Tannas Electronics, Orange, CA.

"Conference Record of the 1991 International Display Research Conference," Papers and Hyatt Islandia, San Diego, CA Oct. 15–17, 1991, The IEEE Electronic Devices Society, The Society for Information Display and The Advisory Group on Electron Device '91 CH–3071–8.

Kabayashi, Ikunorie et al., "Rear–Projection TV Using High–Resolution A–Si–TFT–LCD," SID International Symposium Digest of Technical Papers, XX, (May 18, 1989).

PROJECTION MONITOR

RELATED APPLICATIONS

This is an application pursuant to 35 U.S.C. §111 claiming priority to PCT International Application No. PCT/US94/01549, filed on Feb. 10, 1994 which is a Continuation-in-Part application of U.S. Ser. No. 08/015,813, filed on Feb. 10, 1993 now U.S. Pat. No. 5,467,154 which is a Continuation-in-Part of U.S. Ser. No. 07/839,241, filed on Feb. 20, 1992, now abandoned, the above priority applications are being incorporated herein by reference in their entirety.

BACKGROUND OF THE INVENTION

Flat-panel and projection displays are being developed which utilize liquid crystals or electroluminescent materials to produce high quality images. These displays are expected to supplant cathode ray tube (CRT) technology and provide a more highly defined television picture. The most promising route to large scale high quality liquid crystal displays (LCDs), for example, is the active-matrix approach in which thin-film transistors (TFTs) are co-located with LCD pixels. The primary advantage of the active matrix approach using TFTs is the elimination of cross-talk between pixels, and the excellent grey scale that can be attained with TFT-compatible LCDs.

Flat panel displays employing LCDs generally include five different layers: a white light source, a first polarizing filter that is mounted on one side of a circuit panel on which the TFTs are arrayed to form pixels, a filter plate containing at least three primary colors arranged into pixels, and finally a second polarizing filter. A volume between the circuit panel and the filter plate is filled with a liquid crystal material. This material will rotate the polarization of light when an electric field is applied across it between the circuit panel and a ground affixed to the filter plate. Thus, when a particular pixel of the display is turned on, the liquid crystal material rotates polarized light being transmitted through the material so that it will pass through the second polarizing filter.

The primary approach to TFT formation over the large areas required for flat panel displays has involved the use of amorphous silicon which has previously been developed for large-area photovoltaic devices. Although the TFT approach has proven to be feasible, the use of amorphous silicon compromises certain aspects of the panel performance. For example, amorphous silicon TFTs lack the temporal frequency response needed for large area displays due to the low electron mobility inherent in amorphous material. Thus the use of amorphous silicon limits display speed, and is also unsuitable for the fast logic needed to drive the display.

Owing to the limitations of amorphous silicon, other alternative materials include polycrystalline silicon, or laser recrystallized silicon. These materials are limited as they use silicon that is already on glass which generally restricts further circuit processing to low temperatures.

Thus, a need exists for a method of forming high quality TFTs at each pixel of a panel display having the desired speed and providing for ease and reduced cost of fabrication.

SUMMARY OF THE INVENTION

The present invention relates to a projection monitor, or a high definition projection monitor, having a housing in which the imaging system, projection optics and viewing screen are configured within a compact volume.

The system involves presenting an image to a person on a screen which renders the image visible to the observer in such a way that the image is erect and correct left to right. The source of light for this system may be a self illuminating source such as a CRT screen or a separate light source combined with light modulating means such as a liquid crystal light valve. An important constraint for this system is that it be compact and preferably of a size that accommodates convenient mounting on a user's desk.

In the preferred embodiment, a liquid crystal light valve is used in combination with either an incandescent or arc discharge light source such as a short arc xenon lamp. This provides a light source and a spatial light modulating element which can be imaged onto a rear projection screen. The screen can take a number of forms to provide varying degrees of light redirection to accommodate the preferences of a user. This could include a completely diffuse screen such as opal glass, lenticular screens which preferentially spread the light along one axis, ground glass or "white" plastic, to other types of diffusion effects which redirect the light in a controlled manner. A different type of diffusion is required if an image were to be presented to a large group rather than a single individual.

Another objective of the present invention is compactness. In order to minimize the size, and preferentially the depth of the unit (by this we mean the distance front to back of the system so that it can readily fit on a persons desk and not cover an excessive amount of the desk surface) the optical system inside the enclosure is folded. A folded system can include one or more mirrors in combination, the size of the enclosure being minimized in an optimal way using these mirrors.

In a preferred embodiment two mirrors are used. Note that there is one large mirror between the objective lens and the screen and a second fold mirror located within the projection lens. Note that the location of the mirror is chosen to minimize the size of the enclosure and its location within the optical path can be either within this lens or on either side thereof, but between the imaging element and the larger or "angled" mirror.

In some applications projection of a monochrome image is sufficient. It is becoming increasingly preferable to provide the user with a full color image. This can be accomplished in several ways. First, a full color modulatable light source such as a color CRT could be used. Alternatively, three separate modulatable colored light sources could be used and their images combined in a controlled way to provide to the user a full color image. This can be accomplished using beamsplitters and preferably dichroic beamsplitters. Dichroic beamsplitter are beamsplitters that preferentially reflect or transmit different parts of the optical spectrum. They provide an efficient way for combining images of different colors. Another alternative is to use a single color filtered light valve system.

It is important to note the distinction between what we term an Integral Spatially Modulated Light Source (ISMLS) such as a color CRT and a Modular Image Source (MIS) comprising an emitting light source, condensing optics, and a spatial light modulator which creates the image. The MIS can achieve color separation with filters contained within the modulator or the condensing optics.

A preferred embodiment of the projection monitor utilizes three liquid crystal active matrix display panels. A light source illuminates the active matrix panels and a projection lens magnifies the image from the active matrix panels onto a viewing screen. A mirror reflects the images received from the projection lens onto the viewing screen. The mirror can be positioned at an angle in the range between 36° and 45° relative to the viewing screen. This position for the mirror provides a compact configuration.

The active matrix, the projection lens, the mirror and viewing screen are housed in an enclosure. The enclosure has a front and back surface. A plane extends along the front surface through which the viewing screen is viewed. The back surface is adjacent to the mirror and slopes at an angle to the plane between 36° and 45° and which is generally parallel to the mirror. A line orthogonal to the plane through the front surface of the enclosure which extends from the plane to a point on the back surface furthest from the plane defines what is referred to in this application as the depth of the enclosure. In a preferred embodiment, the depth of the enclosure is approximately between 33% and 41% of the diagonal length across the viewing screen.

For available projection display systems, the depth of the enclosure or housing generally exceeds 50% of the diagonal of the viewing screen. This is due largely to the failure to conform the outer shape of the enclosure to the minimum volume occupied by the projection system, optics and screen.

A preferred embodiment of the projection lens requires an unusually long back focal length as compared to its effective focal length. The back focal length of the lens is the distance from the last element of the lens to the paraxial image plane. Conventional lenses have back focal lengths that are 0.5 to 0.8 of their focal lengths. In order to accommodate the requisite beam splitters to achieve a color display, a larger back focal length is required. The back focal length must exceed the height of the vertical format, provide clearance for the nearly telecentric beam cone, and space for air flow around the cube and the LCD light valve. For a particular embodiment for example, a back focal length (29 mm) in air exceeding the focal length (27.7 mm) was required. Thus the present invention employs a projection system whose back focal length exceeds the focal length.

To maximize the light transmitted to the screen, a low F/# lens is desired. To minimize the package size a short focal length wide angle lens is desired. These requirements in combination with the back focus demand that a wide angle, relatively high speed, retro-focus lens be used.

The LCD size is chosen as a compromise between size and cost. To provide high resolution a large number of pixels are used. To minimize size, it is desirable to use the smallest pixels possible that are consistent with the resolution capabilities of affordable lenses. In recent years the 35 mm film image format has become increasingly popular. The state of lens design for this format is highly optimized and there are a large number of commercially available lenses in this format. The pixel size for lenses for 35 mm format is compatible with high resolution LCD requirements. There are also economies of scale to be achieved by standardizing on a particular LCD format that shares dimensions with a standard conventional lens format.

For the purposes of this application we use the term light source to describe a light emitting element in combination with condensing optics.

The present invention incorporates a projection lens system that occupies a smaller volume which at the same time reduces the angle between the viewing screen and the adjacent mirror to provide an overall reduction in depth and height of the monitor. The enclosure is shaped to conform to this reduced monitor volume. For the purposes of this application the screen diameter is the largest distance extending across the viewing screen. In the case of rectangular screens, for example, the screen diameter corresponds to the diagonal length of the rectangular viewing surface.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 8d is a cross-sectional view of the projection screen of FIG. 8a.

FIG. 9 is a side view of the projection monitor of FIG. 8a.

FIG. 10 is a top view of the projection monitor of FIG. 8a.

FIG. 11 is a front view of the projection monitor of FIG. 8a.

FIG. 14b is a perspective view of the projection monitor of FIG. 14a.

DETAILED DESCRIPTION OF THE INVENTION

Figure 1:
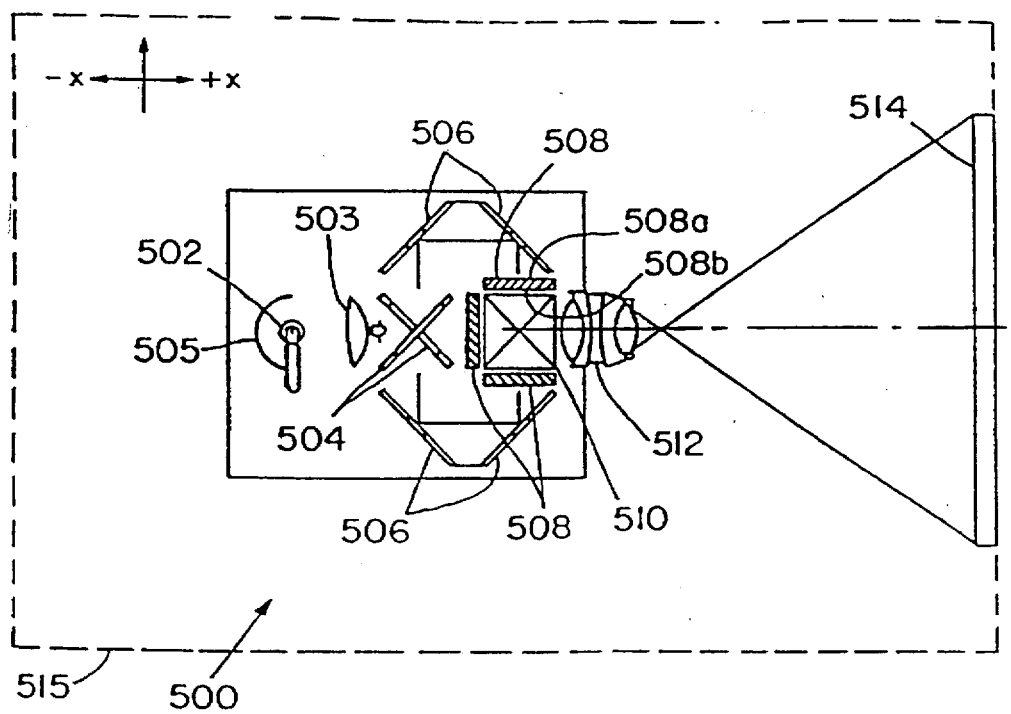
FIG. 1 is a cross-sectional view of a preferred projection system employed in a high resolution monitor of the present invention.

An embodiment of the present invention is a projection monitor which is shown in FIG. 1. The projection monitor includes a projection system 500 which produces multicolor images that are ultimately directed to an enlarged surface 514 which may be a projection screen, a mirror, or lens. While a direct path from the projection system 500 to the surface 514 is shown in FIG. 1, in preferred embodiments the image output from the projection system is passed through an optical geometry before being projected onto the surface 514. Cooling can be provided by a fan or a suitable heat sink.

Within the projector, light from a light source including, for example a halogen lamp 502, is directed by a reflector 505 and a condenser lens 503 to a crossed pair of dichroic mirrors 504. The condenser lens 503 is preferably designed for maximum collection efficiency to collect light emitted in the +X direction. The spherical reflector 505 collects light emitted in the −X direction and images the light of the lamp back beside itself.

White light from the lamp 502 is directed to the crossed dichroic mirrors 504 which separate the light into red, green and blue primary color portions. The separated colors of light are directed by adjacent mirrors 506 to illuminate the back side 508a of each of three liquid crystal light valve matrices 508. In accordance with the present invention, each light valve matrix 508 comprises an array of transistors, an array of electrodes, polarizers, cover glass, and drivers formed in a thin film of substantially single crystal silicon and an adjacent liquid crystal material through which light is selectively transmitted to the surface 514 (described in detail below).

Each light valve matrix 508 is controlled by a driver circuit for modulating the individual light valves so that the illuminating light may be selectively transmitted through the liquid crystal material to form an image in the respective primary color at the front side 508b of the matrix. The three primary color images are then optically combined by a dichroic prism 510 into a single multi-color light beam. The light beam is projected by a projection lens 512 to the surface 514. Further details regarding light valve matrices, including color filter elements to form a color filter display using a single light valve, are described in U.S. application Ser. No. 07/944,207 filed on Sep. 11, 1992 which is herein incorporated by reference.

In another preferred embodiment, the projection system employs a single light valve matrix modulated to produce a monochrome light beam which is projected onto the enlarged surface. In yet another preferred embodiment, each light value matrix employs a ferroelectric material to direct an image to a viewing surface for display.

Figure 2:
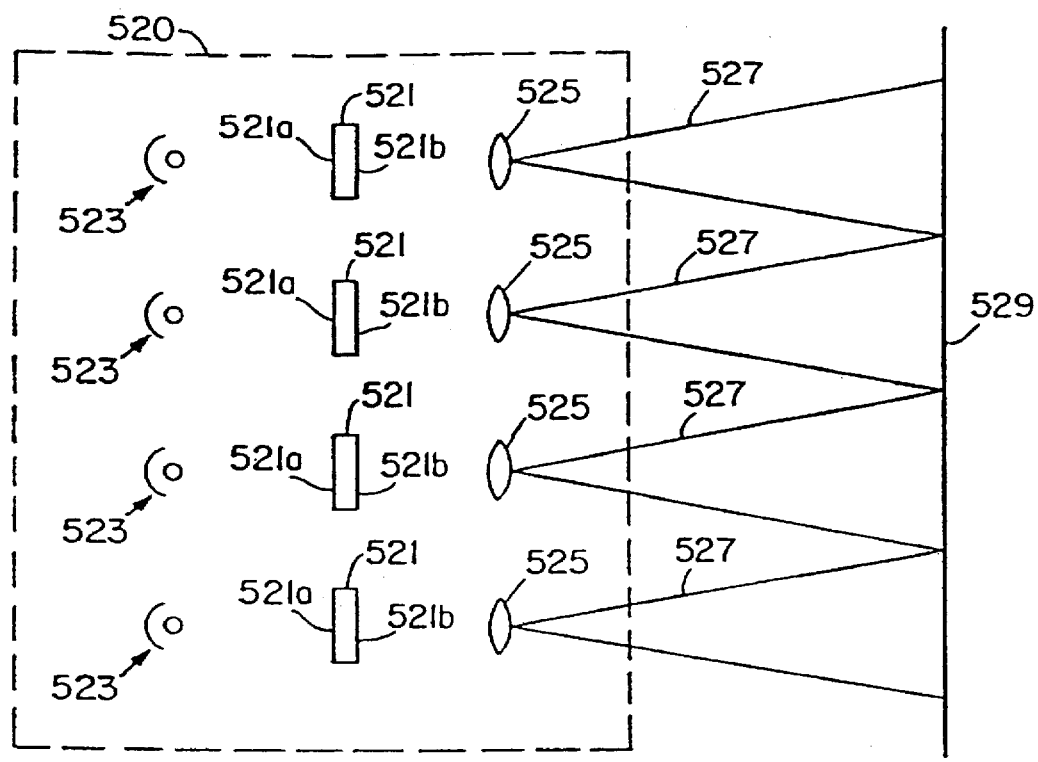
FIG. 2 is an illustration of another preferred projection system.

Although a preferred projection system has been described with three light valve matrices and a particular internal optical geometry, preferred embodiments may include one or more light valve matrices configured with various internal optical geometries. For example, in one preferred embodiment a high resolution composite image can be produced in a projection system 520 having four or more light valves arranged with individual optics. Referring to FIG. 2, four light valve matrices 521 each provide an N×N pixel array. Light from each light source 523 is directed to illuminate the back 521a of a respective matrix 521. Each light valve matrix is controlled by a drive circuit (not shown) for modulating the individual light valves (or pixels) so that the illuminating light may be selectively transmitted through the liquid crystal material within the matrix to form an image at the front side 521b of the matrix. Note that each matrix 521 may be capable of producing monochrome or multi-color images.

Each image, which is preferably compatible with 35 mm optics, is directed to a respective lens 525. Each lens provides a light beam 527 which is projected onto a portion of the surface 529. As such, each matrix is configured to provide an image segment of the composite image. Using this configuration, a composite high resolution image having a pixel density of N×4N is produced. The composite image may then be displayed onto a screen or directed through an optical geometry for display.

Figure 3:
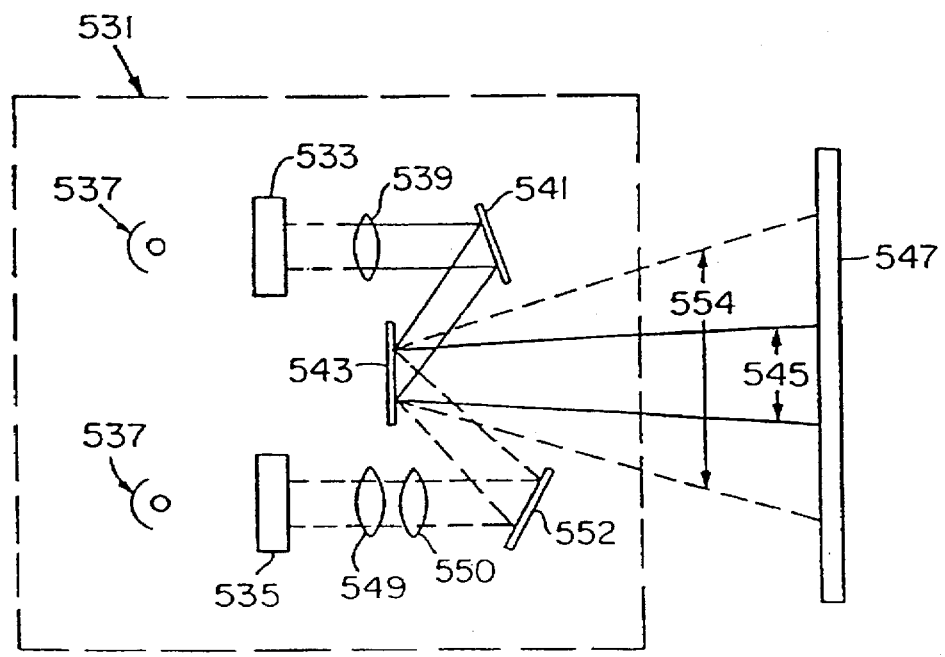
FIG. 3 is an illustration of another preferred projection system.

In another preferred embodiment, a pair of light valve matrices are employed with an optical arrangement in a projection system to provide high resolution images. Referring to FIG. 3, a pair of light valves matrices 533 and 535 are positioned in a projection system 531. Light from light sources 537 is directed to illuminate the back of the respective matrices. Each matrix 533 and 535 is controlled by a drive circuit (not shown) and may produce monochrome or color images. The image formed at the front side of each matrix is directed to a respective lens system. More specifically, the image produced by the matrix 533 is directed by focal lens 539 to mirror 541 and lenticular mirror 543. The image reflects off the mirror 541 as well as another mirror 543 and is projected onto the center area 545 of the surface 547. Similarly, the image produced by the matrix 535 is directed by lenses 549 and 550 to mirror compensating lenticular 552 to adjust for any difference in path length and mirror 543. However, the mirror 552 is arranged such that the image, reflected off mirror 552 and mirror 543, is projected onto a large area 554 of the surface 547. The two images reflecting off of the mirror 543 combine to produce a high resolution center area 545 and a lower resolution periphery 554 on the surface 547.

Figure 4:
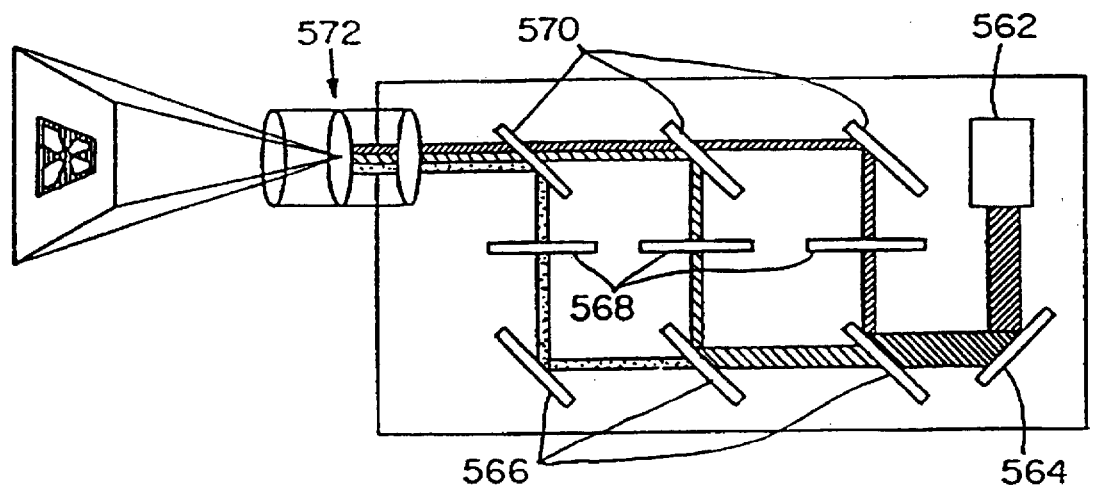
FIG. 4 is an illustration of another preferred projection system.

An image projector 560 employing the principles of the present invention is shown schematically in FIG. 4. The projector employs a zoom or variable focal length lens 572 for projecting images to a viewing surface (not shown). By replacing the zoom lens 572 with a simple fixed focal length lens, the projection system within the projector can be employed in the monitor of FIG. 5. The projection system of FIG. 4 employs yet another optical configuration for directing light. White light from a lamp 562 is reflected off a mirror 564 and directed to three dichroic mirrors. The separated colors of light are directed by the mirrors to illuminate the back side of three liquid crystal light valve matrices 568 that are all equidistant from the lens 572. Each matrix, controlled by a driver circuit (not shown), selectively transmits light to form an image in the respective primary color at the front side of the matrix. The three primary color images are directed via dichroic mirrors 570 to lens 572. The lens combines the images into a single multi-color light beam.

As explained previously, the projector 560 employs a plurality of single crystal silicon light valve matrices and an optical geometry for producing high resolution color (or monochrome) images. The resulting images are directed through a zoom or fixed focal length projection lens 572 to form an image beam capable of being front or back projected onto a viewing surface or screen. As in previous embodiments, the projector provides high resolution images while being compatible with 35 mm optics.

Figure 5:
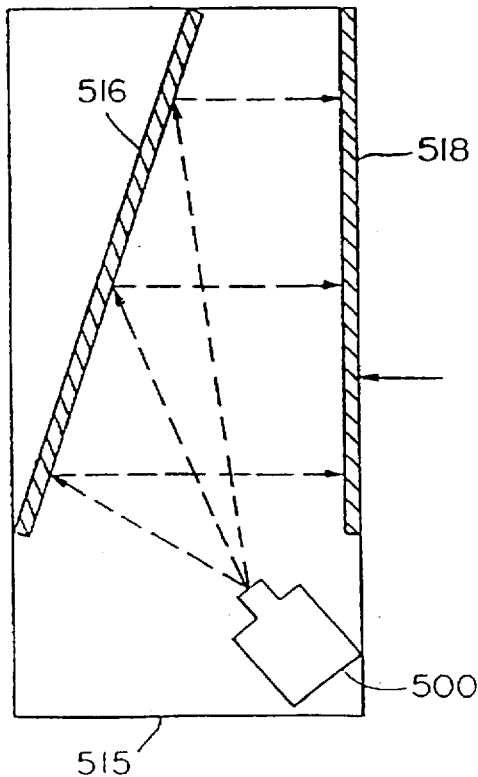
FIG. 5 is an illustration of a preferred high resolution monitor of the present invention.

Referring to FIG. 5, the projection monitor 515 includes an optical arrangement for directing the light beam from the projector to a screen 518. To that end, the projection system 500 projects a monochrome or multi-color light beam to a mirror 516. The mirror is positioned at angle relative to the projection system such that light reflecting off the mirror is collimated. The collimated light is directed to the back side of a large viewing screen 518. As such, images may be viewed at the front side of the screen 518.

Figure 6:
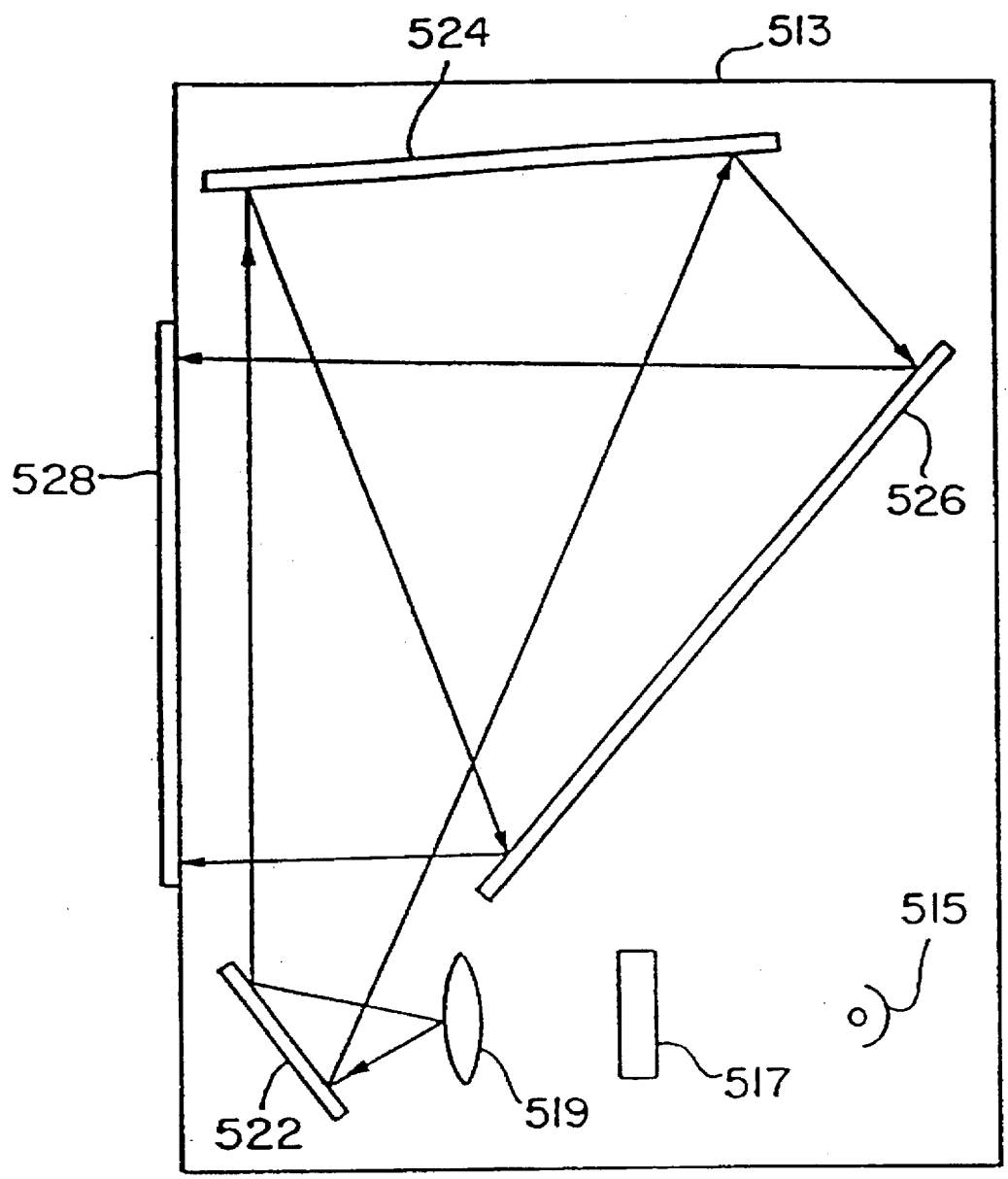
FIG. 6 is an illustration of a high resolution projection monitor which employs a folded optics geometry.

FIG. 6 shows a high resolution projection monitor 513 which employs a folded optics geometry. The monitor comprises a light source 517a which directs light to the active matrix 517b. The resulting light image is directed to a lens 519. The light images is directed form the lens to three mirrors 522, 524, 526 and projected onto the back side of a viewing screen 528. The light images can be viewed at the front side of the screen 528.

Figure 7:
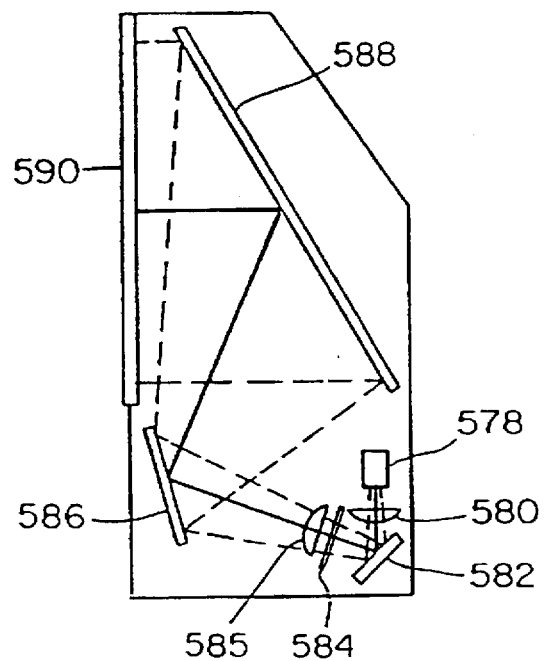
FIG. 7 is an illustration of another preferred high resolution projection monitor of the present invention.

Another projection device incorporating the principles of the present invention is a projection monitor shown in FIG. 7. For simplicity of illustration purposes, a single light valve matrix and a supporting optics geometry is shown; however, preferred embodiments include plural light valve matrices each having a supporting optics geometry. With reference to FIG. 7, a light source 578 generates white light which is directed by a lens 580 to a mirror 582. The dichroic mirror 582 separates the white light into a single primary color and directs the colored light to the light valve matrix 584. The light is selectively transmitted through the matrix forming a image which is directed by lens 585 to a folded optical arrangement of mirrors. As such, the image is directed to a first mirror 586 which in turn directs the image to a second mirror 588. The second mirror is positioned such that light reflecting off of it is collimated. The collimated single color image is combined with other single color images generation by adjacent light valves and the resulting collimated image is directed to the back side of a large viewing screen 590. As such, high resolution images may be viewed at the front side of the screen.

Projection display devices of the present invention can employ light valve matrices having pixel densities which satisfy any of a wide range of the following existing computer display format requirements:

| Application | Display Format (Column × Row) |
|---|---|
| 1) Common Personal Computer | 1024 × 768 |
|  | 1280 × 1024 |
| 2) Workstation | 1280 × 1024 |
| (Advanced Personal Computer) | 1580 × 1280 |
|  | 2048 × 2048 |
| 3) Other Workstations (Non-Standard) | 1152 × 900 |
|  | 1280 × 1024 |
|  | 1600 × 1280 |

Thus, a display monitor employing one or more single crystal silicon light valve matrices having any of the above-described pixel densities can be provided in accordance with the present invention.

One feature of the present invention is that projection devices employing single crystal light valve matrices provide high resolution images. High resolution images are possible because high density light valve arrays may be formed in single crystal silicon films. Referring to Table 1, the light valve diagonal is shown for various array sizes and pixel densities. Note that the diagonal dimensions followed by an asterisk indicate the array is compatible with s 35 mm format as described previously. The use of 35 mm optics is a key feature in minimizing the size, weight and cost of the described optics requiring the light valve image designed dimension to be no greater than 42 mm (1.654 inches). Therefore, it is desirable to use a light valve imaging technology that provides the highest density of information content. The light valve technology discussed herein is compatible with as-fabricated densities of 2000 dots-per-inch. This allows projection of high resolution images using compact, low cost and widely available optical components.

The small size of the light valve allows the use of small format condenser lens assembly dichroic mirrors and prisms and projection lens. Subsequently, the package size of the described projector and monitor can be maintained at small dimensions and component weight is similarly minimized. Appropriate 35 mm format optical components are widely available and can be obtained at low cost relative to large and/or custom optical components. For projector and monitor requirements that cannot be met with a 35 mm compatible light valve, larger conventional or custom optical components may be employed. Due to the minimum size of a particular light valve format afforded by the described light valve technology, similar cost, size and weight advantages are translated to the procurement of custom optical components.

TABLE 1

DIAGONAL ARRAY DIMENSION - INCHES/(MM)
Fabricated dots/inch (DPI) on light valve matrix

| ARRAY SIZE | 800 | 1000 | 1200 | 2000 |
|---|---|---|---|---|
| 1024 × 768 | 1.600* | 1.280* | 1.137* | 0.640* |
|  | (40.64) | (32.51) | (28.88) | (16.26) |
| 1280 × 1024 | 2.049 | 1.639* | 1.366* | 0.820* |
|  | (52.04) | (41.63) | (34.70) | (20.82) |
| 1580 × 1280 | 2.542 | 2.033 | 1.695 | 1.017* |
|  | (64.56) | (51.65) | (43.05) | (25.82) |
| 2048 × 2048 | 3.620 | 2.896 | 2.414 | 1.448* |
|  | (91.96) | (73.57) | (61.32) | (36.78) |

As has been described, the light valve technology described herein can be used to implement projection arrays of 1024×768 through 2048×2048 pixels using 35 mm format optical components. This will permit the execution of high resolution color and monochrome image projectors and monitors at relatively compact dimensions and low weight.

One implementation of the monitor is to form a 17.5 inch×11.5 inch image suitable for the display of two side-by-side 8.5 inch×11 inch pages with additional screen room for data window access. The use of the described light valve and projection technology would allow the physical format of the monitor to be less than 22 inches high, less than 20 inches wide, and less than 10 inches deep. The use of a single 150 to 300 watt quartz-halogen, gas discharge or metal-halide lamp in this implementation would provide the rear-proportion screen image at a brightness of 25 foot-Lamberts or greater. The choice of screen material could include a simple diffuser for maximum viewing angle or a lenticular configuration for maximum brightness over a reduced solid viewing angle.

Another feature of the present invention is that a projection display device employing single crystal silicon light valve matrices provides images with high brightness. To accomplish this, each single crystal silicon light valve matrix employed in a projection display device has a high optical aperture which in this application is defined as the percentage of transparent area to total matrix area. Table 2 provides this optical aperture for various light valve arrays. It is noted that in general the minimum acceptable optical aperture for an array as described herein is 40%. As indicated by Table 2, as pixel density increases, which increases image resolution, optical aperture decreases. However, reducing the switching device size and/or the interconnect size for a given pixel density will increase the optical aperture.

TABLE 2

OPTICAL APERTURE COMPUTATIONS

| | | | | |
|---|---|---|---|---|
| Transistor length (um) | 3 | 3 | 3 | 3 |
| Transistor width (um) | 6 | 6 | 6 | 6 |
| Line width (um) | 2 | 4 | 6 | 8 |
| lines per inch | 1000 | 1000 | 1000 | 1000 |
| pixel size (um) | 25.4 | 25.4 | 25.4 | 25.4 |
| grid shadow (sq. um) | 97.6 | 187.2 | 268.8 | 342.4 |
| trans. shadow (sq. um) | 18 | 18 | 18 | 18 |
| pixel area (sq. um) | 645 | 645 | 645 | 645 |
| Packing Factor (%) | 85 | 85 | 85 | 85 |
| OPTICAL APERTURE (%) | 69.8 | 58.0 | 47.2 | 37.5 |
| Transistor length (um) | 3 | 3 | 3 | 3 |
| Transistor width (um) | 6 | 6 | 6 | 6 |
| Line width (um) | 2 | 4 | 6 | 8 |
| lines per inch | 800 | 800 | 800 | 800 |
| pixel size (um) | 31.8 | 31.8 | 31.8 | 31.8 |
| grid shadow (sq. um) | 123 | 238 | 345 | 444 |
| trans. shadow (sq. um) | 18 | 18 | 18 | 18 |
| pixel area (sq. um) | 1008 | 1008 | 1008 | 1008 |
| Packing Factor (%) | 85 | 85 | 85 | 85 |
| OPTICAL APERTURE (%) | 73.1 | 73.1 | 73.1 | 73.1 |
| Transistor length (um) | 3 | 3 | 3 | 3 |
| Transistor width (um) | 6 | 6 | 6 | 6 |
| Line width (um) | 2 | 4 | 6 | 8 |
| lines per inch | 1200 | 1200 | 1200 | 1200 |
| pixel size (um) | 21.2 | 21.2 | 21.2 | 21.2 |
| grid shadow (sq. um) | 80.7 | 153.3 | 218.0 | 247.7 |
| trans. shadow (sq. um) | 18 | 18 | 18 | 18 |
| pixel area (sq. um) | 448 | 448 | 448 | 448 |
| Packing Factor (%) | 85 | 85 | 85 | 85 |
| OPTICAL APERTURE (%) | 66.3 | 52.5 | 40.2 | 29.5 |
| Transistor length (um) | 3 | 3 | 3 | 3 |
| Transistor width (um) | 6 | 6 | 6 | 6 |
| Line width (um) | 2 | 4 | 6 | 8 |
| lines per inch | 2000 | 2000 | 2000 | 2000 |
| pixel size (um) | 12.7 | 12.7 | 12.7 | 12.7 |
| grid shadow (sq. um) | 46.8 | 85.6 | 116.4 | 139.2 |
| trans. shadow (sq. um) | 18 | 18 | 18 | 18 |
| pixel area (sq. um) | 161.3 | 161.3 | 161.3 | 161.3 |
| Packing Factor (%) | 85 | 85 | 85 | 85 |
| OPTICAL APERTURE (%) | 50.9 | 30.4 | 14.2 | 2.2 |

If a self luminous spatial source is used such as CRT, the CRT emits into a full $2\pi$ steradian (hemisphere) of space. The more of the emitted light that is collected, the higher the efficiency of the system and the brighter the image. If a spatial light modulator is used one must be careful to match the capabilities of the spatial light modulator (e.g., liquid crystal light valve) with that of the illuminating source, and the projection optics. Usually liquid crystal light valves exhibit sufficient contrast over a rather limited range of incident angles, perhaps 15 degrees as measured from the surface normal. For light incident within these angles, the light valve can be turned off and on, and the contrast can reach or exceed 100:1 in some cases. Beyond these angles, the performance of the liquid crystal light valve is limited and the contrast can drop to less than 20. In this case the quality of the image presented to the user is not sufficient for demanding image display applications such as computer workstations.

The condensing system and the light source, whether it is an incandescent lamp, discharge lamp, or some other source work in combination to illuminate the light valve in an efficient manner so that the contrast is optimized and the amount of light passing into and throughout the projection lens and onto the screen is maximized.

The projection lens used in this system has a number of unusual constraints. The lens must project an image with low geometrical distortion and good image quality. The sharpness of the image needs to be such that it contains good resolution of all pixels of the spatial light modulator. The lens must be such that its size is minimized or that it can be folded in such a way that the size of the entire package is minimized. Note that the first order design of this system imposes a number of constraints on the system. A typical set of constraints might include the size of the final projected size of the image, the initial size of the image whether it be from a LCD or a CRT type display, and a statement of the resolution or contrast and/or modulation transfer function (MTF) required of the image. These constraints determine the magnification and the number of resolvable pixels across the display. Another constraint is the overall length of the optical path. Given, for example, that the optical path must be less than a specific length, L, then using first order optics one can determine from the previous data (the image size and the LCD size) the focal length of the projection lens.

Object to image Distance $(OID)=EFL*(2+m+1/m)<L$

In this formula the magnification is m, the focal length of the lens is EFL, and the object to image distance is OID. Thus, first order relationships drive the design of the optical system.

If a beamsplitter is to be used behind the lens to provide beam combination for multi-color systems, this imposes an additional constraint which must be accommodated. Space behind the lens must be provided, and this defines the optical design as having back focal length significantly longer then in a conventional design. If the object to image distance is to be minimized, a short focal length is desirable and hence a large back-focal length/focal length ratio is desirable. This a retro-focus type optical system of short focal length. This is a wide angle lens and requires correction for distortion, chromatic aberration and other imaging aberrations.

Figure 8B:
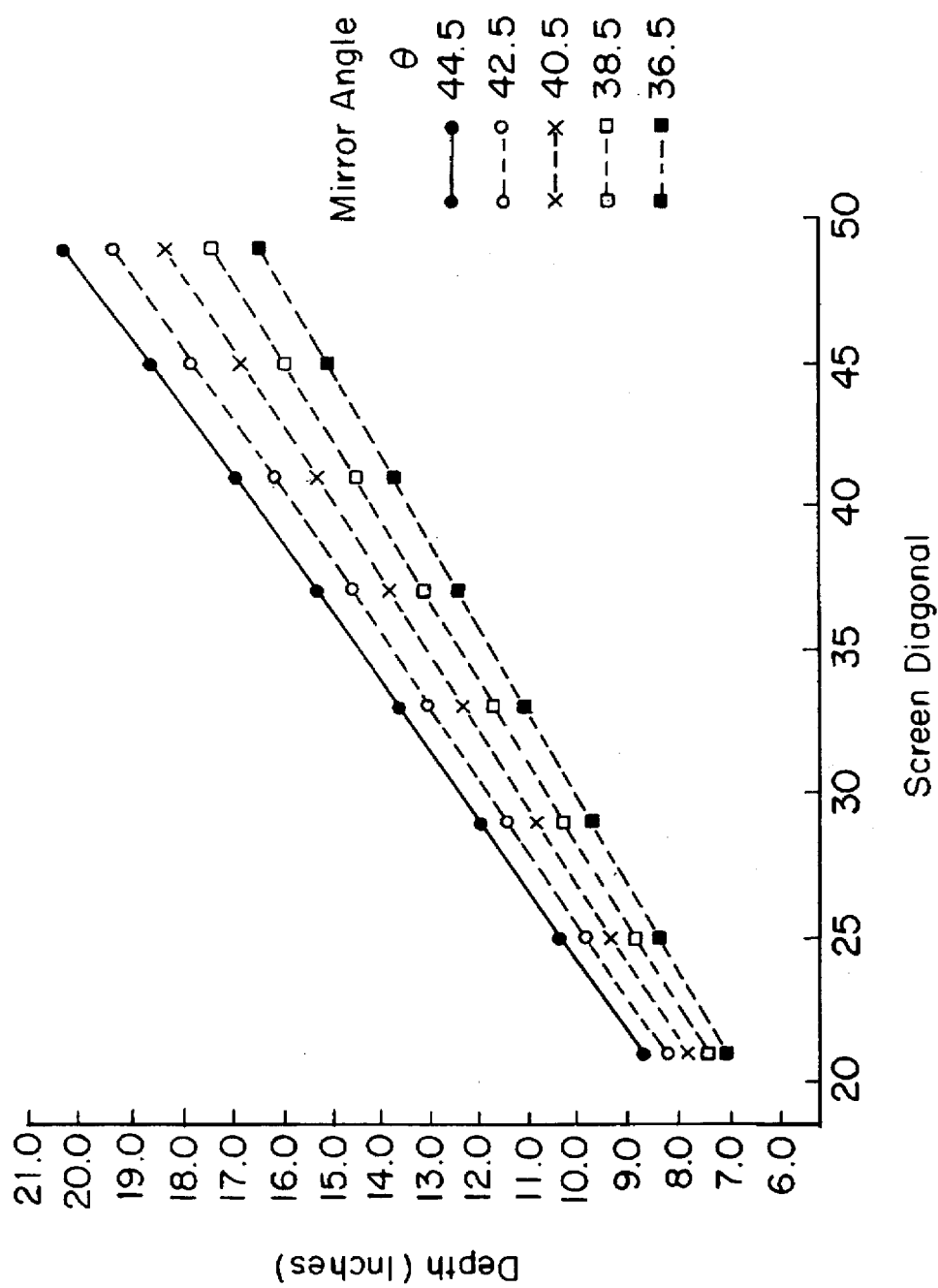
FIG. 8b is a graph showing minimum optical depths for various screen diagonals and mirror angles.
Figure 8A:
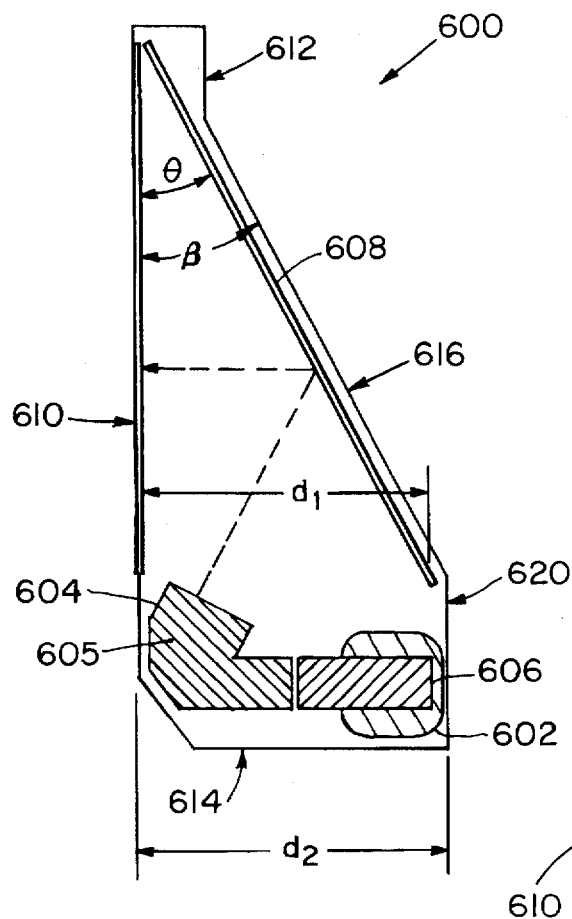
FIG. 8a is a side cross-sectional view of another preferred projection monitor of the present invention.

In FIG. 8a, projection monitor 600 is another preferred embodiment of the present invention. Projection monitor 600 is a rear projection monitor with a narrow housing depth $d_2$. Housing 612 contains light source 602, light Valve active matrix system 606, projection lens 604, mirror 608 and viewing screen 610. The flat bottom 614 acts as a base on which projection monitor 600 rests. Images produced by active matrix system 606 and illuminated by light source 602 are projected by projection lens 604 onto viewing screen 610 via mirror 608.

The minimum optical depth $d_1$ is the distance between screen 610 and the point on mirror 608 furthest away from screen 610. The minimum optical depth, $d_1$, is a function of the size of screen diagonal $d_3$ of viewing screen 610 (see for example, FIG. 11) and the mirror angle, θ, between screen 610 and mirror 608. Diagonal length, $d_3$, is the distance across screen 610 between corners 610a and 610b. Screen 610 is shown to be rectangular, but alternatively can be of other geometrical shapes. The minimum housing depth $d_2$ is approximately the same as optical depth $d_1$ except that the minimum housing depth $d_2$ is between ¼ to ½ inches larger than the minimum optical depth $d_1$ due to the thickness of screen 610 and housing 612.

The mirror angle, θ, ranges between 36 degrees and 45 degrees because mirror angles under 36 degrees would cause the image from projection lens 604 to be blocked by the optical housing 605 surrounding projection lens 604. Mirror angles θ which are over 45 degrees result in a projection monitor having large optical and housing depths $d_1$ and $d_2$, respectively.

FIG. 8b graphically shows values for the minimum optical depth $d_1$ as a function of screen diagonal for rectangular screen diagonal sizes between 21 and 49 inches and mirror angles θ between 36.5 degrees and 44.5 degrees. By varying the mirror angle θ between 36.5 degrees and 44.5 degrees for a given screen diagonal, the minimum optical depth $d_1$ can be varied more than 1.5 inches for a screen diagonal of 21 inches and almost 4 inches for a screen diagonal of 49 inches. A mirror angle θ of 36.5 degrees provides a narrow optical depth $d_1$ which is approximately 33% of the diagonal length or diameter $d_3$ of screen 610. A mirror angle of 44.5 degrees provides a larger optical depth $d_1$ which is approximately 41% of the diagonal length of screen 610.

Table 3 provides the numerical values for optical depth, screen diagonal and mirror angle graphically shown in FIG. 8b for various screen sizes. The values given in Table 3 and FIG. 8b are for a 28 mm projection lens. Alternatively, other size projection lenses between 24 mm and 35 mm may be used.

TABLE 3

| 28 MM LENS | | ANGLE OF MIRROR TO SCREEN | | | | |
|---|---|---|---|---|---|---|
| | | 36.5 | 38.5 | 40.5 | 42.5 | 44.5 |
| Screen Diagonal | 21 | 7.1 | 7.4 | 7.8 | 8.3 | 8.7 |
| | 25 | 8.4 | 8.9 | 9.3 | 9.8 | 10.3 |
| | 29 | 9.7 | 10.3 | 10.8 | 11.4 | 12.0 |
| | 33 | 11.1 | 11.7 | 12.3 | 13.0 | 13.6 |
| | 37 | 12.4 | 13.1 | 13.8 | 14.5 | 15.3 |
| | 41 | 13.8 | 14.5 | 15.3 | 16.1 | 16.9 |
| | 45 | 15.1 | 16.0 | 16.8 | 17.7 | 18.6 |
| | 49 | 16.5 | 17.4 | 18.3 | 19.3 | 20.2 |

Figure 8E:
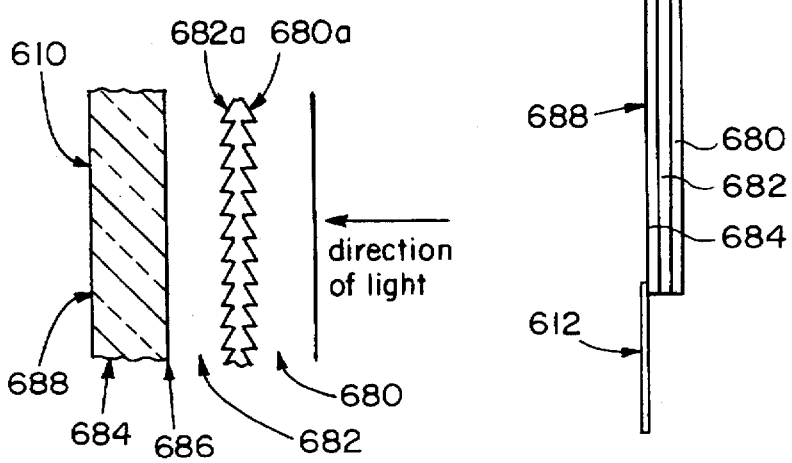
FIG. 8e is a magnified cross-sectional view of the projection screen of FIG. 8d.
Figure 8D:
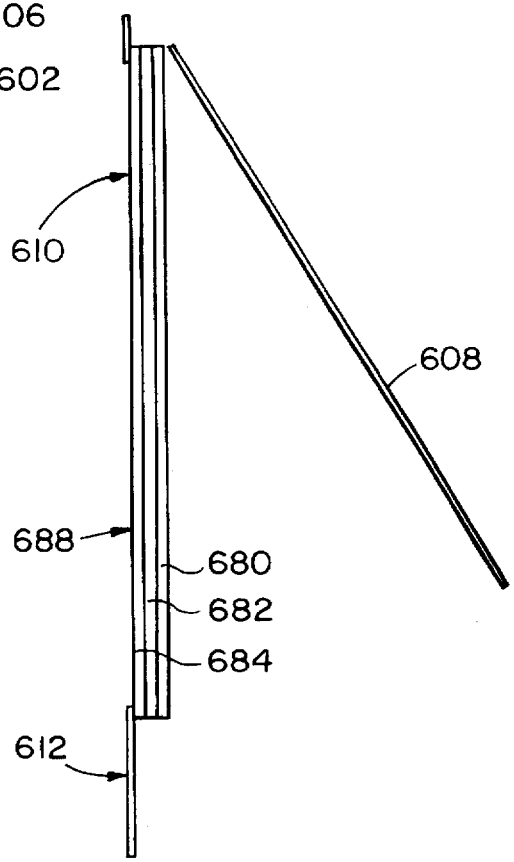
Figure 8C:
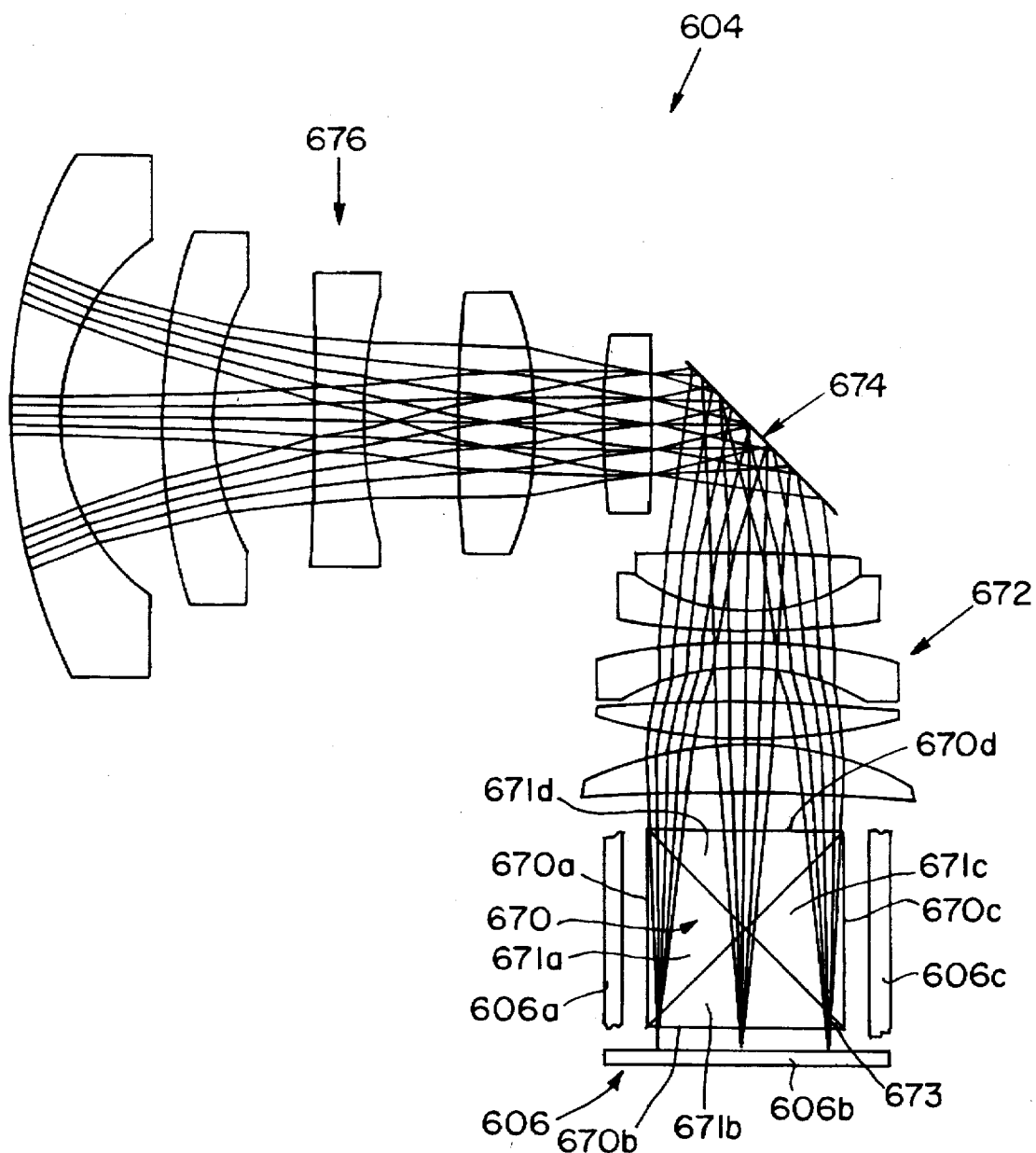
FIG. 8c is schematic view of the projection optics for a preferred embodiment projection monitor.

Projection lens 604 is depicted in greater detail in FIG. 8c. Images are produced by active matrix system 606. In the preferred embodiment active matrix system 606 has three monochrome active matrix elements 606b, 606b and 606c which can provide red, green and blue light components, for example. Active matrix elements 606b, 606b and 606c are positioned adjacent to faces 670a, 670b and 670c of dichroic prism 670. Each active matrix element is equidistant from prism 670. Dichroic prism 670 is a rectangular block of four prisms 671a, 671b, 671c and 671d cemented together. The interfaces 673 between the prisms are coated with a dichroic coating. Light source 602 has three individual light sources positioned behind each active matrix element 606b, 606b and 606c to illuminate those matrix elements or the light source can alternatively employ a mirror system to direct light from a single lamp onto the three liquid crystal display elements as described in more detail above. The images from each active matrix element in the active matrix system 606 can be combined by a dichroic prism 670. The images combined by prism 670 exit face 670d and pass through a series of spherical lenses 672. The images are reflected off of mirror 674 and pass through a second series of spherical lenses 676. The images exit the series of lenses 676 and are reflected off of mirror 608 (FIG. 8a) to be viewed on screen 610.

The insertion of mirror 674 between lenses 672 and 676 creates a fold in projection lens 604 so that projection lens 604 becomes more compact. This minimizes the optical depth $d_1$ and the housing depth $d_2$ resulting in a more compact size for the projection monitor 600. Alternatively, mirror 674 can be positioned after the series of lenses 676.

Projection lens 604 enlarges the images received from active matrix system 606 in the range between 12 and 30 times for screen diagonals between 21 and 50 inches. The object focal distance to the lens is between 1 and 3 inches from the lens. Projection lens 604 has a large back-focus distance in order to combine three different beams corresponding to red, green or blue color images. Alternatively, active matrix system 606 can be a single active matrix with a red, green and blue color filter over each pixel.

The optics are based upon a 4:3 horizontal screen ratio. Alternatively smaller ratios can be used such as 5:4 or 1:1.

In an alternative embodiment, one or more of the lens elements in lens series 672 and 676 can be aspherical lenses. This reduces the size of projection lens 604 thereby eliminating the need to fold projection lens 604. Aspherical lenses can correct for color and distortion more effectively than conventional spherical lens elements. Also, the elements in lens series 672 and 676 can be plastic or a combination of glass and plastic. Additionally, two separate dichroic prisms in a staircase configuration can be used to combine first two of the colors, then the third. This configuration calls for a back focal length distance at least 2 times the length of the active matrix. Furthermore, a co-planar configuration can be used in which two separate dichroic filters combine the three colors but has all three active matrices in the same plane side by side. This configuration calls for a back focal length distance of over three times the length of the active matrix.

Referring to FIGS. 8d and 8e, screen 610 directs and enhances the light of images projected upon screen 610 with uniform brightness to one or more viewers. To direct the light, the screen 610 includes optical elements, such as one or more Fresnel lenses 680 and 682 which direct the light towards the viewer position. Fresnel lenses 680 and 682 are positioned such that grooved surfaces 680a and 682a are facing each other. The images are focused onto scattering surface 686 of front panel 684. Front panel 684 is made of transparent plastic or glass and scattering surface 686 faces Fresnel lens 682. Alternatively, one Fresnel element can be used to optimize the brightness uniformity from the screen 610. Additionally, outer surface 688 can be coated for low reflectivity and front panel can be tinted to improve color contrast. Furthermore, non-Fresnel techniques for redirecting the light can be used.

Figure 8F:
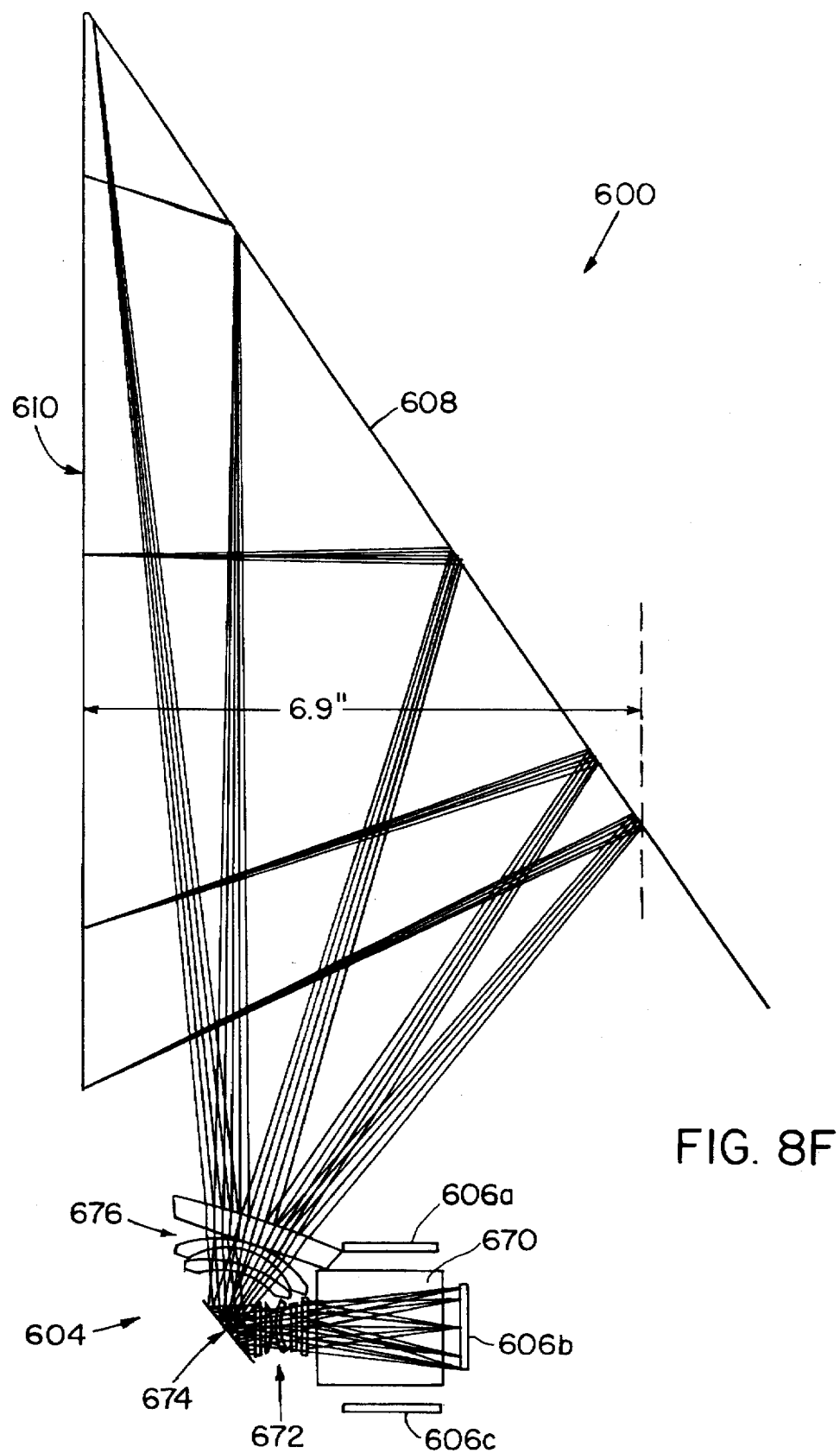
FIG. 8f is a cross-sectional view showing the optical system of a preferred embodiment.
Figure 8G:
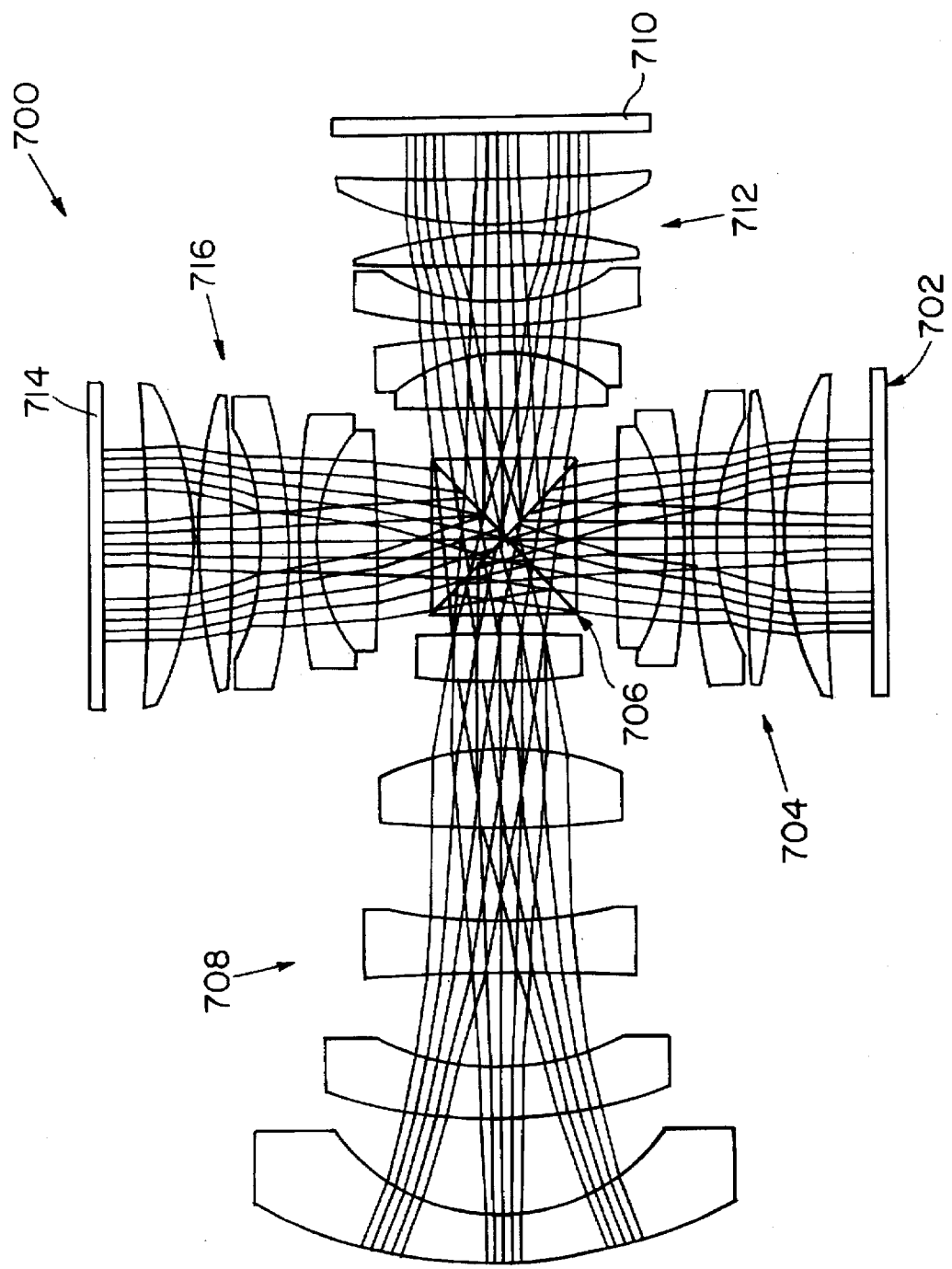
FIG. 8g is a detailed cross-sectional view of a three light valve projection lens.

FIG. 8f illustrates the use of the above described lens in conjunction with the above described lens. FIG. 8g shows system 700 with three light valves 702, 710 and 714 which are optically coupled to half lens 704, 712 and 716 which direct light into beam splitter 706, which combines the three images and directs them through lens 708.

In the preferred embodiment there is a fold mirror provided within the lens itself. In a further embodiment, this fold mirror with a beamsplitter which would split the beam into three paths to allow for more separate optical paths for the three colors. The beamsplitter behind the lens would no longer be needed and the system would have three optical paths splitting out from front to back. This system is less desireable since the back half of the optical system is fabricated for each of the three colors and the performance of each of these is accurately matched so that the images presented to the user are of the same size and orientation.

Mounting all three light valves around one beamsplitter provides a convenient approach for keeping the system modular. In this case only one projection lens is required and it is by design matched to all three colors simultaneously. This does, however, require that the light valves be accurately located on the side of the prism and also focused so that when looking into the prism the three color images are optically located in the same position.

It is important that the image presented to the observer is erect and correct left to right. The reflections and folds require that the components be accurately positioned.

The condensing system is required to transform the distribution of light emitted from the light source into a controlled distribution which evenly illuminates the light valve and fill the entrance pupil of the projection lens. Conventional illumination systems are possible using condensing lenses and concave reflectors mounted around the bulb. Others are also possible such as homogenizers and light pipes which redirect the light from the source using three dimensional structures fabricated from reflective materials such as glass mirror, or other highly reflective materials such as aluminized mylar or aluminum.

Figure 9:
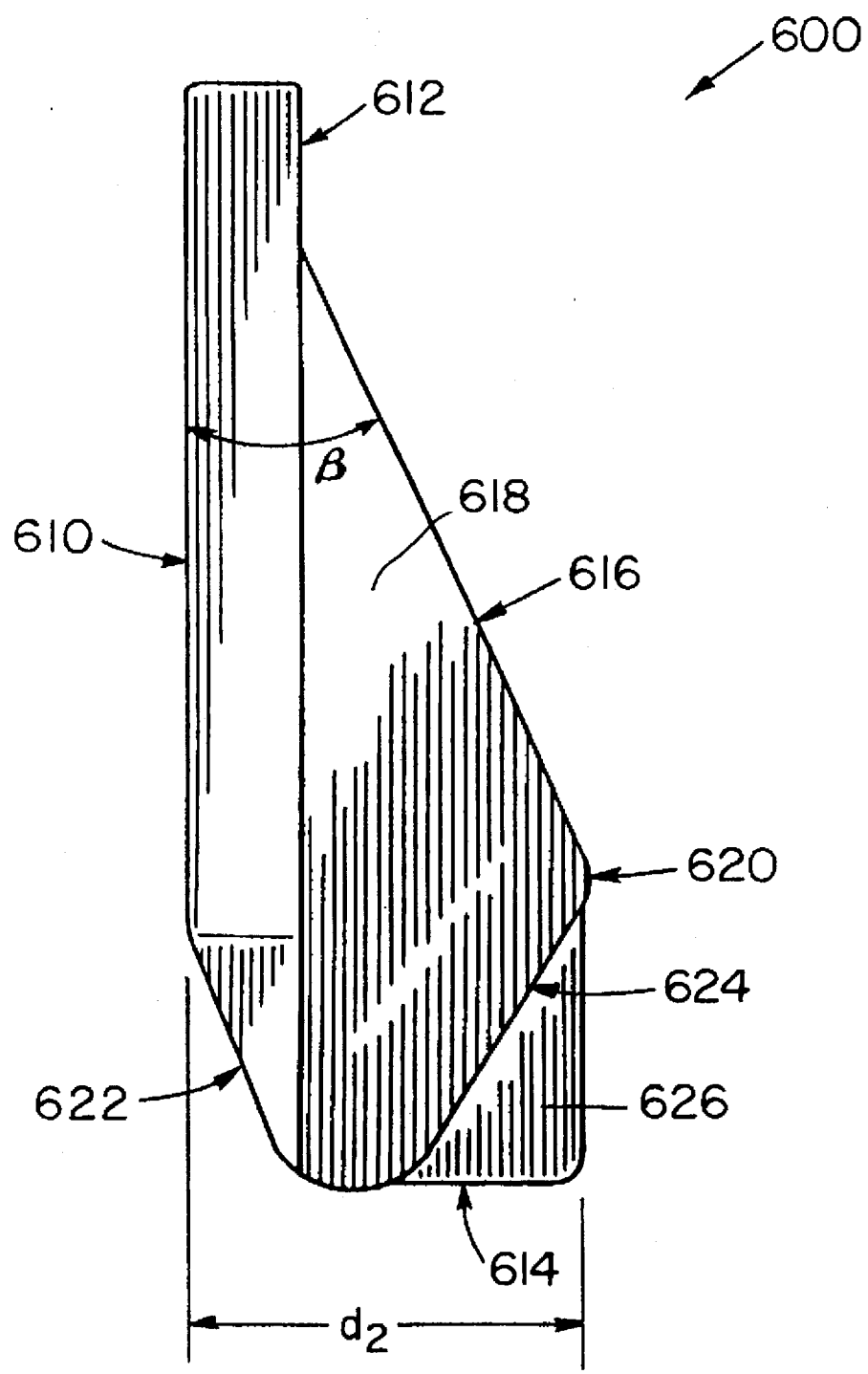
Figure 10:
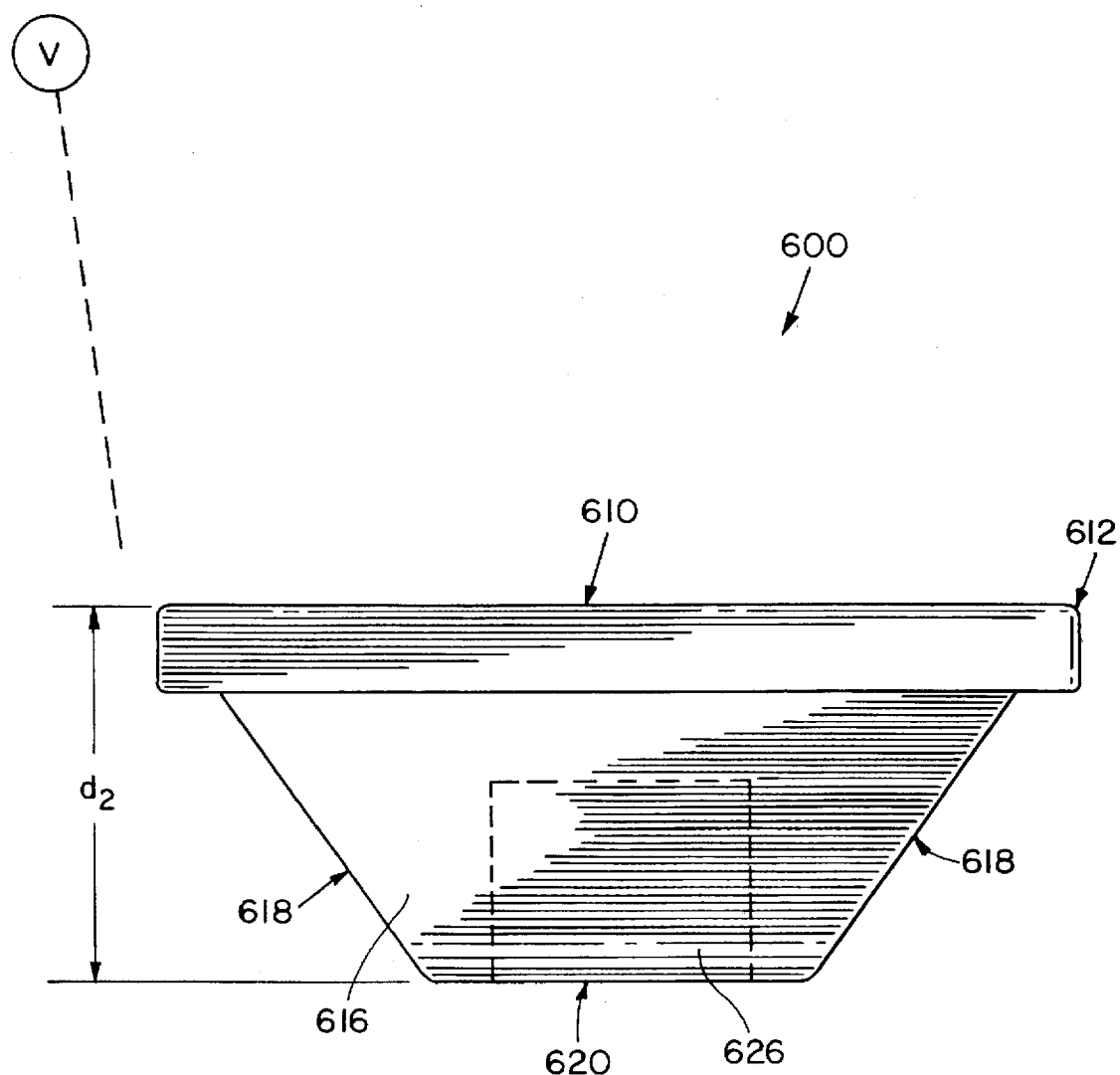
Figure 11:
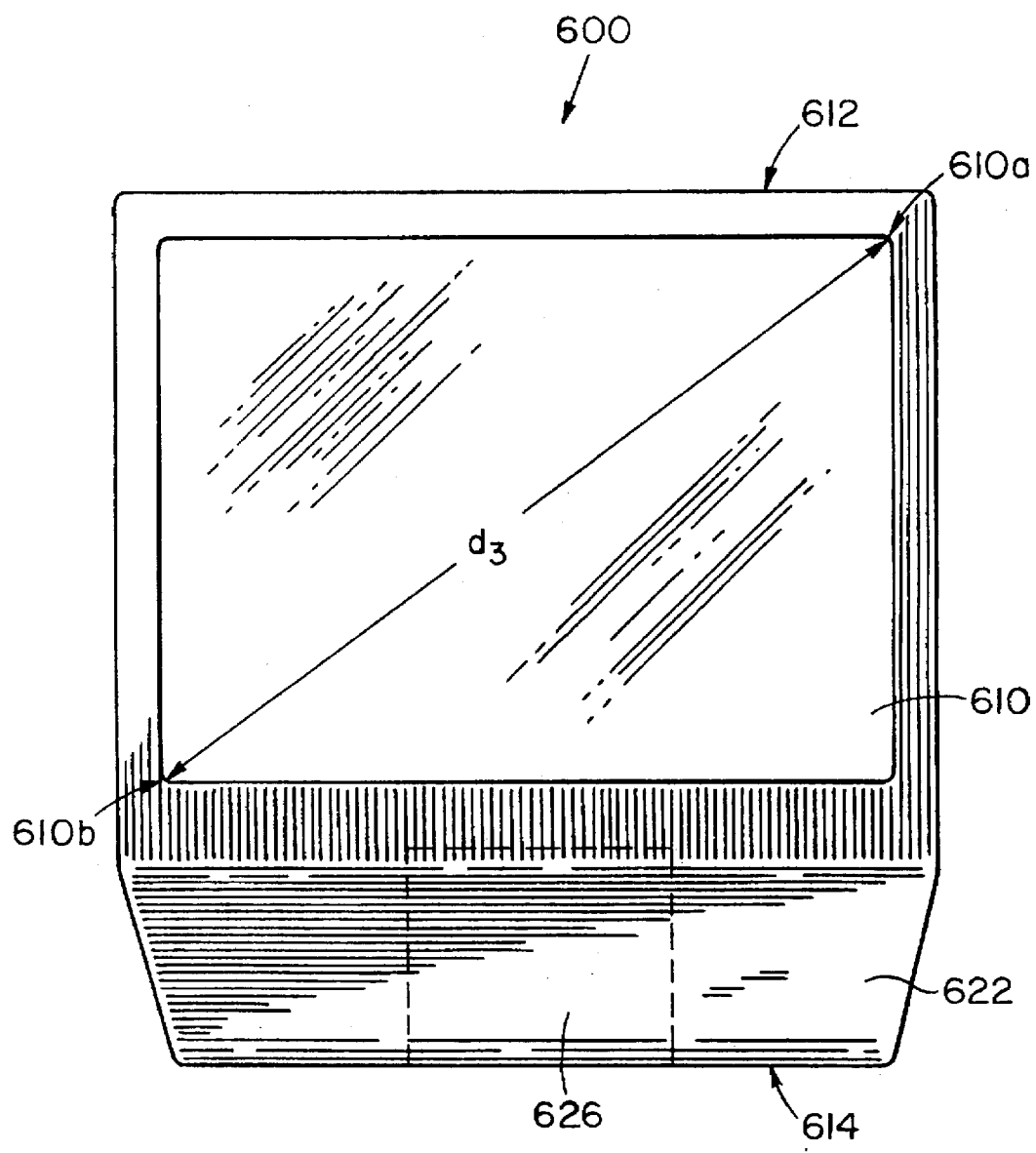

In FIGS. 9, 10 and 11, the outside of the housing 612 can be seen. Housing 612 is made of molded plastic. The sloping back 616 slopes at an angle β which is the same as mirror angle θ between screen 610 and mirror 608 depicted in FIG. 8a or within ±5 degrees thereof. Back 616 terminates at rear extremity 620 which is the point along back 616 which is furthest away from screen 610. The front lower surface 622 slopes downward from screen 610 and meets back lower surface 624 which slopes downward from rear extremity 620. Base 626 provides a bottom surface 614 which serves as a stand for projection monitor 600. The monitor depth $d_2$ is the distance between the front of screen 610 and the rear extremity 620. Two smooth sidewalls 618 slope from screen 610 to rear extremity 620 of projection monitor 600. The sloping nature of sidewalls 618 prevents a viewer "V" from seeing sidewalls 618 when viewing projection monitor 600 at an angle.

Figure 12:
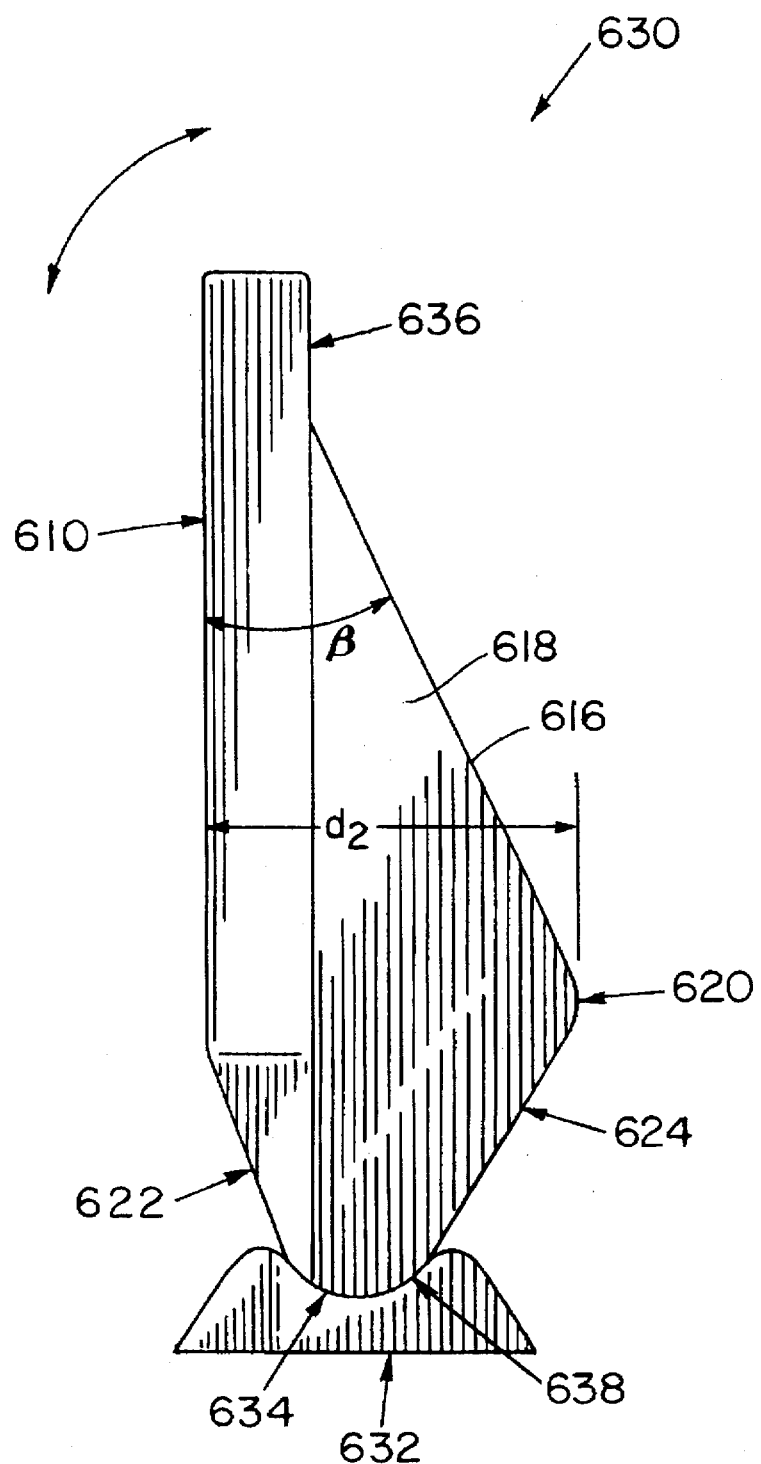
FIG. 12 is a side view of a preferred embodiment of a projection monitor with an adjustable base.

In FIG. 12, another preferred embodiment projection monitor 630 is different from projection monitor 600 in that housing 636 has a rounded bottom 634 which rests and rotates within a radius 638 within monitor stand 632. Rounded bottom 634 is formed at the junction between front lower surface 622 and back lower surface 624 at a position located under the center of gravity of projection monitor 630. Rounded bottom 634 and monitor stand 632 permit projection monitor 630 to be tilted up or down.

Figure 13:
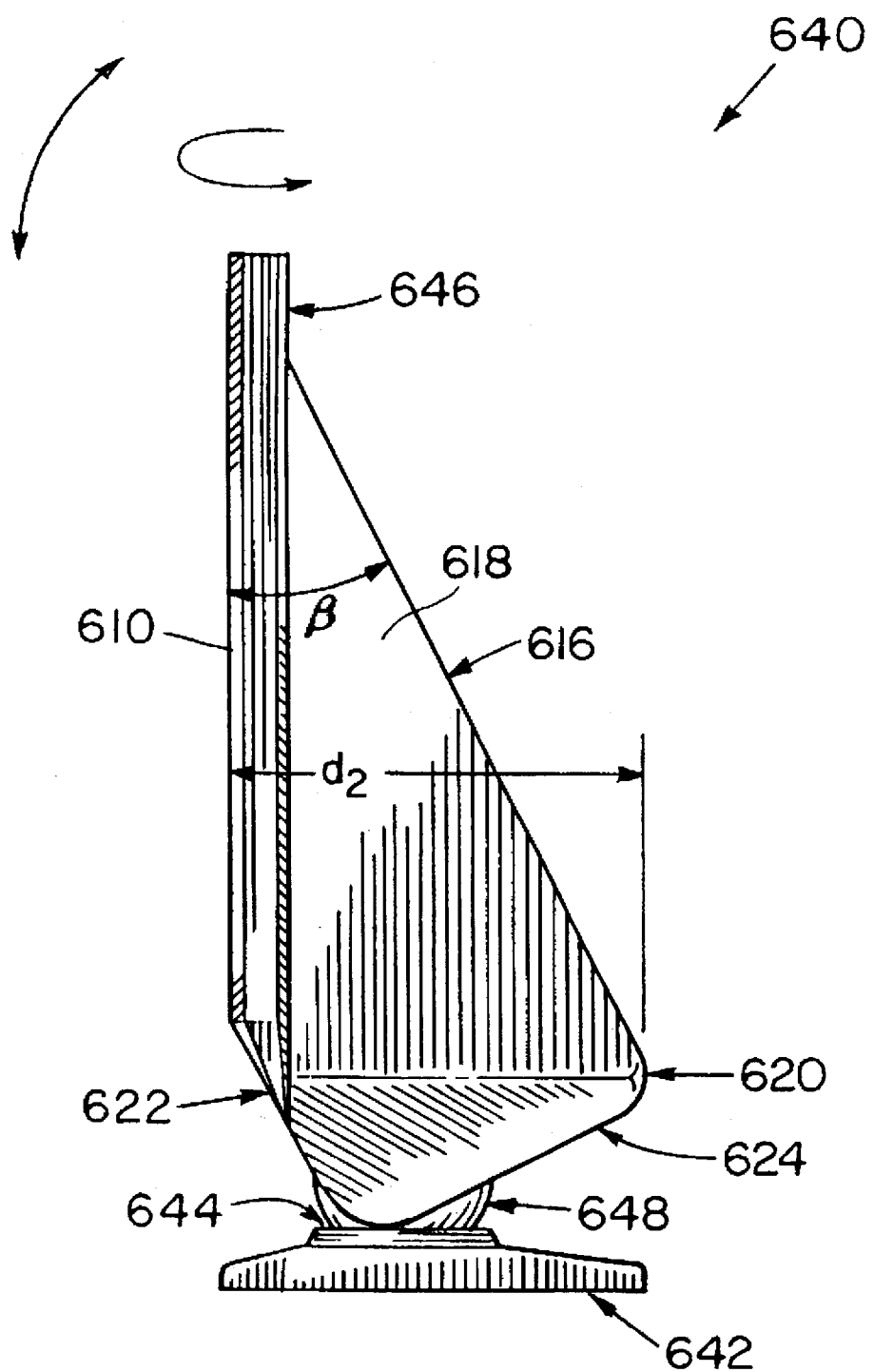
FIG. 13 is a side view of a preferred embodiment of a projection monitor with a ball and socket adjustable base.

In FIG. 13, another preferred embodiment projection monitor 640 has a housing 646 in which a ball 648 rests in socket 644 of monitor stand 642. Ball 648 is located at the bottom of projection monitor 640 centrally located under the center of gravity of projection monitor 640. Ball 648 and socket 644 allows projection monitor 640 to swivel side to side as well as tilt up and down.

Figure 14A:
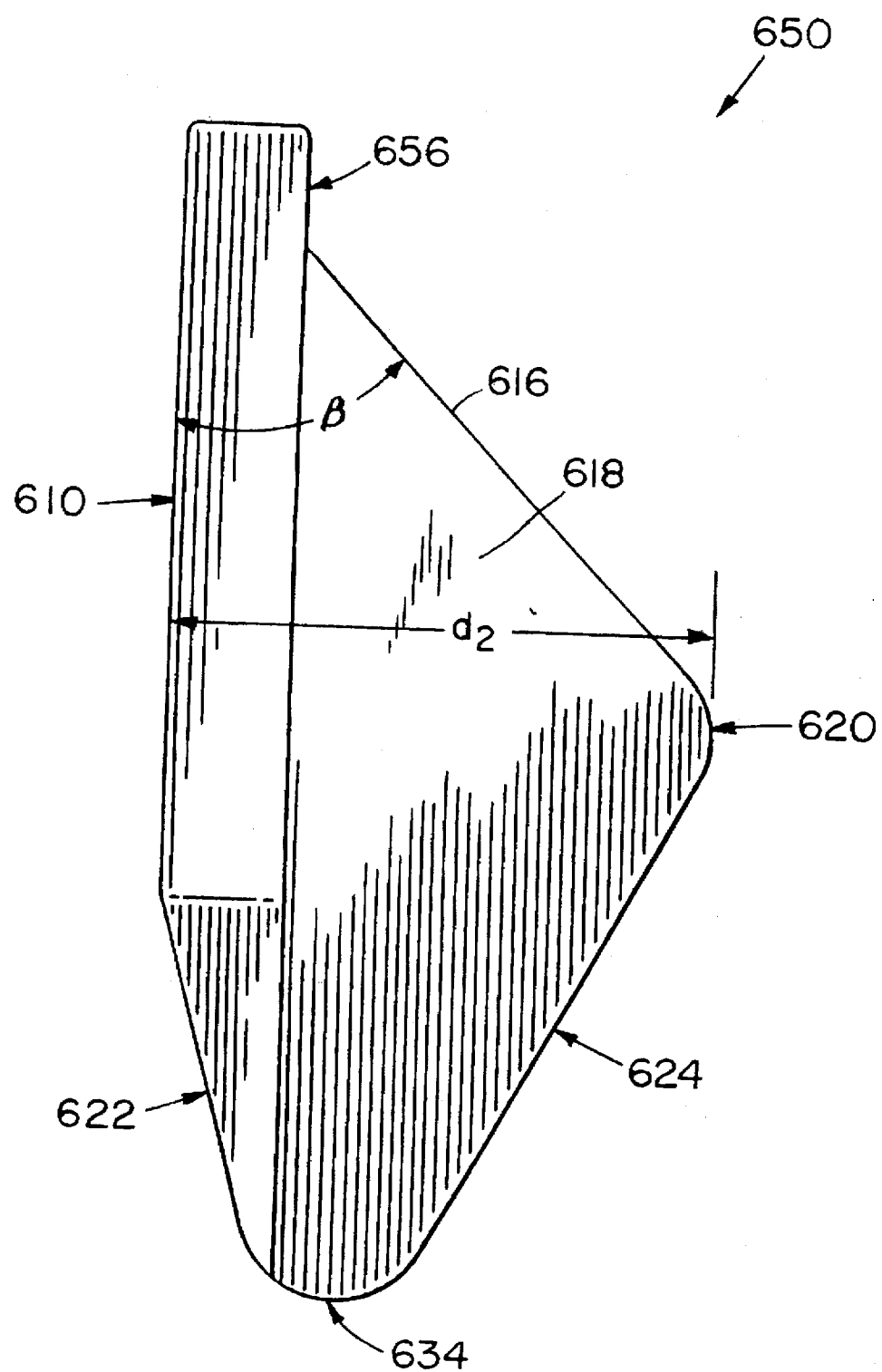
FIG. 14a is a side view of a preferred embodiment of a projection monitor having a large angle between the screen and the mirror.
Figure 14B:
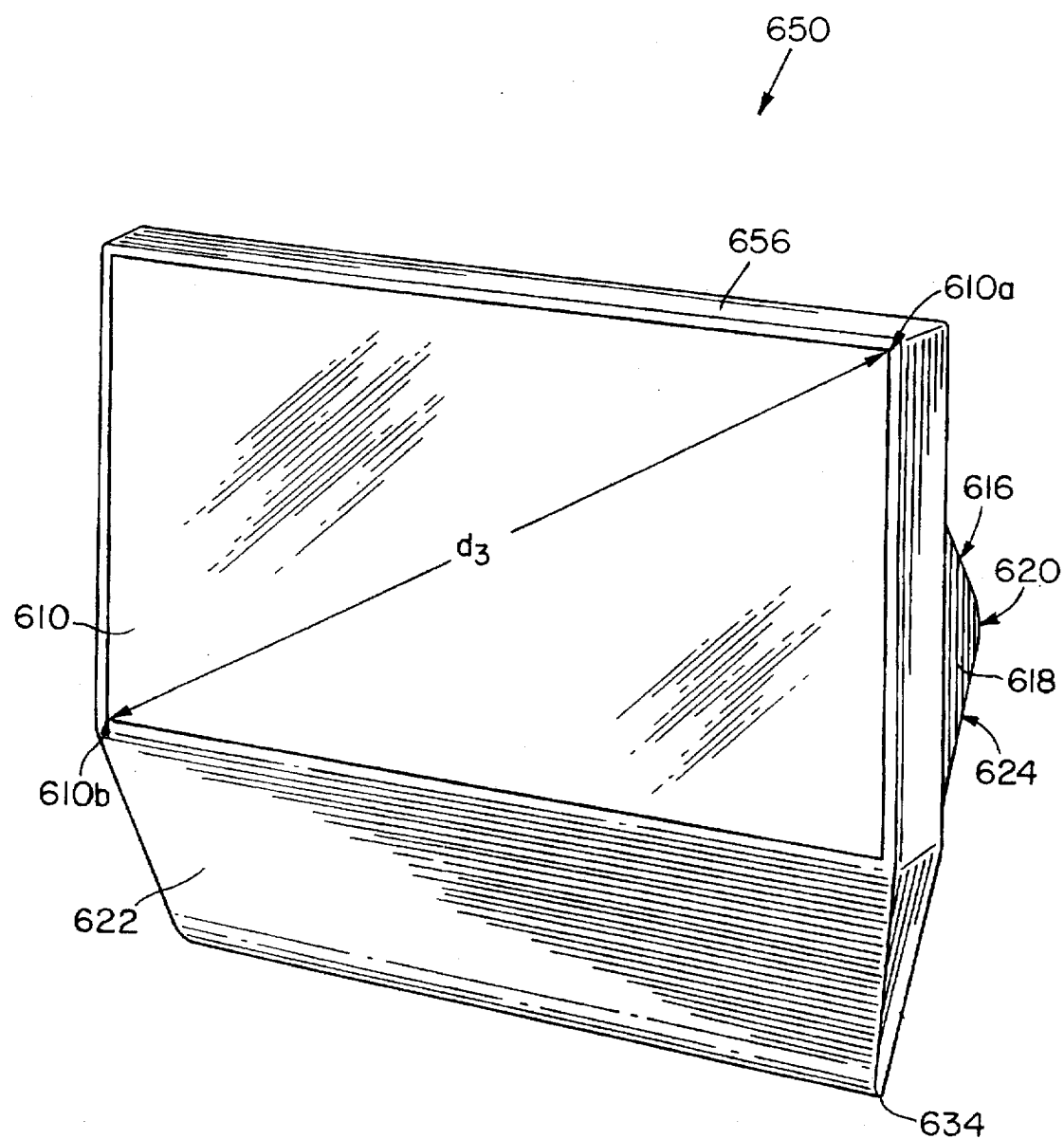

FIGS. 14a and 14b depict another preferred embodiment of the present invention. Projection monitor 650 has a housing 656 in which sloping back 616 slopes at a large angle β relative to screen 610. The large angle β results in a large housing depth $d_2$ between screen 610 and rear extremity 620. The sloped sidewalls 618 are virtually unnoticeable as illustrated in FIG. 14b.

Figure 15:
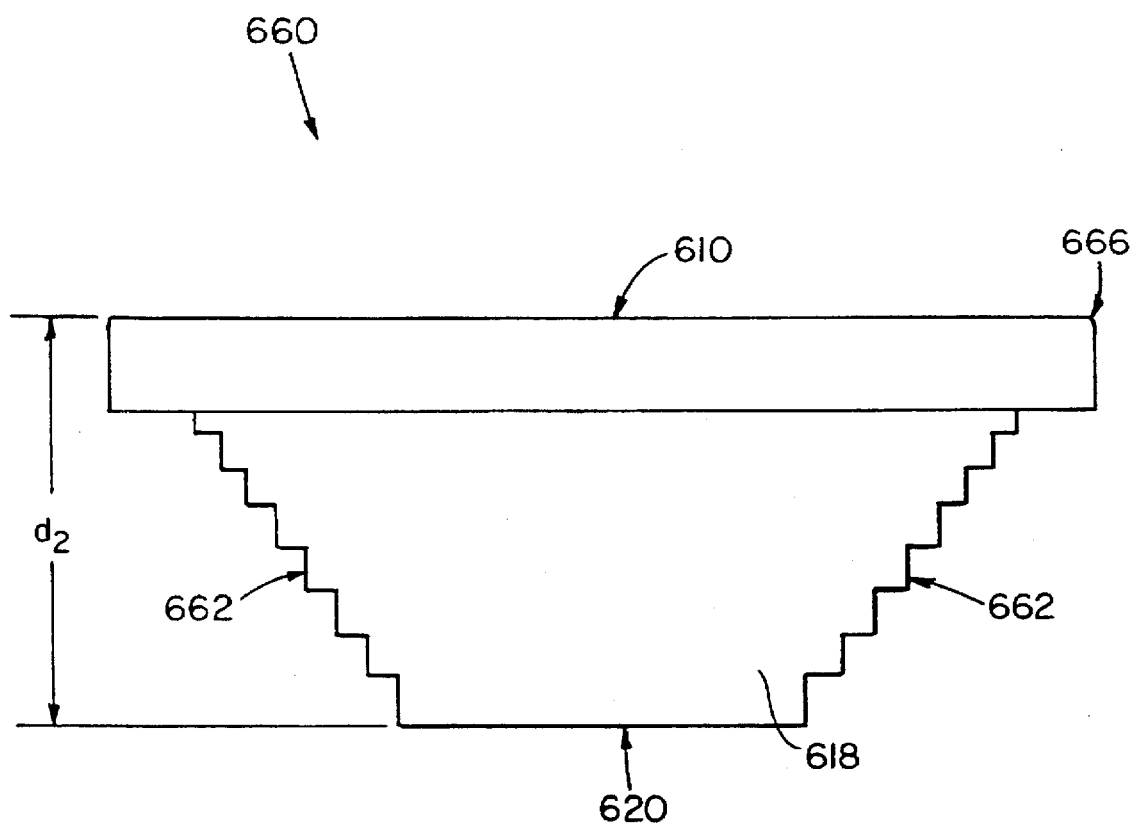
FIG. 15 is top view of a preferred embodiment of a projection monitor having stepped sidewalls.

In an alternative embodiment, shown in FIG. 15, projection monitor 660 has a housing 666 with stepped sidewalls 662. Stepped sidewalls 662 provide more structural rigidity than the smooth sidewalls 618 depicted in FIGS. 9 and 10 while at the same time preserving the wide angle defined by the back sidewalls of the housing.

Equivalents

While this invention has been particularly shown and described with references to preferred embodiments thereof, it will be understood by those skilled in the art that various changes and form and details may be made therein without departing from the spirit and scope of the invention as defined by the dependent claims.

We claim:

1. A projection monitor comprising:
a light valve display assembly having first, second and third active matrix liquid crystal display panels for producing multicolor images along an optical path;
a light source optically coupled to the light valve display assembly;
a wide angle, retro-focus projection lens assembly having a dichroic prism, a series of lenses and an intermediate mirror optically disposed within the series of lenses for magnifying and projecting the images received from the active matrix display panels, the dichroic prism combining images received from the active matrix display panels, and the intermediate mirror folding the optical path through the lens assembly;
a receiving mirror for reflecting images received from the projection lens assembly;
a viewing screen for viewing images received from the receiving mirror; and
an enclosure having a front surface and a back surface for housing the light source, the light valve display assembly, the projection lens assembly, the receiving mirror and the viewing screen.

2. The projection monitor of claim 1 in which the mirror is positioned at an angle between 36° and 45° in relation to the viewing screen.

3. The projection monitor of claim 1 in which the enclosure further comprises sidewalls which slope at an oblique angle from the front surface towards the back surface.

4. The projection monitor of claim 3 in which the sidewalls have a series of steps therein.

5. A projection monitor comprising:
a first liquid crystal active matrix display for producing images along an optical path;
a light source for illuminating the active matrix;
a projection lens for enlarging and projecting the images received from the active matrix;
a mirror for reflecting images received from the projection lens;
a viewing screen for viewing images received from the mirror, the viewing screen positioned such that the mirror is at an angle between 36° and 45° from the viewing screen; and
an enclosure for housing the light source, the active matrix, the projection lens, the mirror and the viewing screen, the enclosure having a front surface and a back surface, a plane extending along the front surface through which the viewing screen is viewed, the back surface sloping away from the front surface at an angle to the plane between 36° and 45°, the back surface being adjacent to the mirror.

6. The projection monitor of claim 5 further comprising second and third active matrix displays for producing images of different colors than the first active matrix.

7. The projection monitor of claim 6 in which the light source illuminates the first, second and third active matrix displays.

8. The projection monitor of claim 7 in which the projection lens comprises:
a dichroic prism for combining images received from the active matrices; and
a series of lenses for enlarging and projecting the images.

9. The projection monitor of claim 8 in which the optical path through the projection lens is folded by an intermediate mirror optically disposed within the series of lenses.

10. The projection monitor of claim 5 in which the enclosure further comprises: sidewalls which slope at an angle from the front surface towards the back surface.

11. The projection monitor of claim 10 in which the sidewalls have a series of steps therein.

12. A projection monitor comprising:
a light valve display assembly having a plurality of display panels for producing multicolor images along an optical path;

a light source optically coupled to the light valve display assembly;

a wide angle, retro-focus projection lens assembly having a dichroic prism, a series of lenses and an intermediate mirror optically disposed within the series of lenses for magnifying and projecting the images received from the active matrix display panels, the dichroic prism combining images received from the active matrix display panels, and the intermediate mirror folding the optical path through the lens assembly;

a receiving mirror for reflecting images received from the projection lens assembly;

a viewing screen for viewing images received from the receiving mirror; and an enclosure having a front surface and a back surface for housing the light source, the light valve display assembly, the projection lens assembly, the receiving mirror and the viewing screen.

13. The projection monitor of claim 12 wherein the active matrix display panels are liquid crystal display panels.

14. The projection monitor of claim 12 wherein the active matrix display panels are illuminated by a common light source.

15. The projection monitor of claim 12 wherein the active matrix display panels have an array size of at least 1024× 768.

16. The projection monitor of claim 12 wherein the active matrix display panels include transistors fabricated from single crystal silicon.

* * * * *